(12) United States Patent
Matsuoka et al.

(10) Patent No.: US 8,202,943 B2
(45) Date of Patent: Jun. 19, 2012

(54) FLUIDITY-IMPROVING AGENT, AROMATIC POLYCARBONATE RESIN COMPOSITION, AND SHAPED ARTICLE THEREOF

(75) Inventors: Shinji Matsuoka, Hiroshima (JP); Yasuhiko Nabeshima, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 354 days.

(21) Appl. No.: 12/521,040

(22) PCT Filed: Dec. 25, 2007

(86) PCT No.: PCT/JP2007/074876
§ 371 (c)(1),
(2), (4) Date: Jun. 24, 2009

(87) PCT Pub. No.: WO2008/081791
PCT Pub. Date: Jul. 10, 2008

(65) Prior Publication Data
US 2010/0029855 A1    Feb. 4, 2010

(30) Foreign Application Priority Data

Dec. 25, 2006 (JP) ................................. 2006-347026

(51) Int. Cl.
*C08F 212/08* (2006.01)
*C08F 220/16* (2006.01)
*C08L 25/08* (2006.01)
*C08L 33/06* (2006.01)

(52) U.S. Cl. ........ 525/228; 525/154; 525/191; 525/241; 525/472

(58) Field of Classification Search .................. 525/185, 525/190, 191, 228, 229, 241, 154, 155, 165, 525/166, 472, 418
See application file for complete search history.

(56) References Cited

U.S. PATENT DOCUMENTS 4,906,696 A * 3/1990 Fischer et al. ............... 525/148
4,937,285 A 6/1990 Wittmann et al.

| | | |
|---|---|---|
| 2005/0159533 A1 | 7/2005 | Nabeshima et al. |
| 2007/0213451 A1 | 9/2007 | Nabeshima et al. |
| 2007/0260015 A1 | 11/2007 | Stork et al. |

FOREIGN PATENT DOCUMENTS

| | | |
|---|---|---|
| DE | 10 2004 059 243 A1 | 2/2006 |
| EP | 2 100 918 A1 | 9/2009 |
| JP | 58-49942 | 3/1983 |
| JP | 64 81807 | 3/1989 |
| JP | 1 115914 | 5/1989 |
| JP | 1-165656 | 6/1989 |
| JP | 6 306230 | 11/1994 |
| JP | 2000 178432 | 6/2000 |
| JP | 2006 201667 | 8/2006 |
| JP | 2006 249292 | 9/2006 |
| JP | 2006 257195 | 9/2006 |
| JP | 2006-306958 | 11/2006 |
| JP | 2007-39490 | 2/2007 |
| WO | WO 98/27159 | 6/1998 |
| WO | 2005 030819 | 4/2005 |
| WO | WO 2006077813 A1 * | 7/2006 |
| WO | WO 2008/081791 A1 | 7/2008 |

OTHER PUBLICATIONS

U.S. Appl. No. 12/921,689, filed Sep. 9, 2010, Matsuoka, et al.
Search Report issued May 19, 2009 in International Application No. PCT/JP2009/054651.
Extended European Search Report issued Jun. 9, 2011, in Patent Application No. 09719203.3.

* cited by examiner

*Primary Examiner* — Irina S Zemel
*Assistant Examiner* — Jeffrey Lenihan
(74) *Attorney, Agent, or Firm* — Oblon, Spivak, McClelland, Maier & Neustadt, L.L.P.

(57) ABSTRACT

A fluidity-improving agent containing 0.5 to 99.5 parts by mass of a polymer (A) which is obtained by polymerizing a monomer mixture (a) containing 0.5 to 99% by mass of (a1) an aromatic vinyl monomer, 0.5 to 99% by mass of (a2) a phenyl(meth)acrylate or a phenyl(meth)acrylate containing a substituent in a phenyl group, and 0.5 to 5% by mass of (a3) a vinyl monomer including a functional group (X), and 0.5 to 99.5 parts by mass of a polymer (B) which is obtained by polymerizing a monomer mixture (b) containing (b1) a phenyl(meth)acrylate or a phenyl(meth)acrylate containing a substituent in a phenyl group with a compound including a functional group (Y) reactive with the functional group (X), where the total of the polymer (A) and the polymer (B) is 100 parts by mass.

15 Claims, 2 Drawing Sheets

FLUIDITY-IMPROVING AGENT, AROMATIC POLYCARBONATE RESIN COMPOSITION, AND SHAPED ARTICLE THEREOF

This application is a 371 of PCT/JP2007/074876, filed Dec. 25, 2007.

TECHNICAL FIELD

The present invention relates to a fluidity-improving agent capable of improving fluidity of an aromatic polycarbonate resin at the time of shaping without deteriorating the intrinsic characteristic properties of the aromatic polycarbonate resin, namely, transparency, resistance to exfoliation of surface layer, thermal resistance, impact resistance, and chemical resistance, and relates to an aromatic polycarbonate resin composition which is containing the fluidity-improving agent and excellent in fluidity, and relates to a shaped article of the aromatic polycarbonate resin composition.

The present application claims the priority of Japanese Patent Application No. 2006-347,026 filed on Dec. 25, 2006, the contents of which are incorporated herein by reference.

BACKGROUND ART

Aromatic polycarbonate resins are excellent in mechanical strength, thermal resistance, electrical characteristic properties, and dimensional stability, and hence used in a variety of fields such as OA, namely, office automation, appliances, information and communications equipment, electric and electronic equipment, electric household appliances, automotive parts, and building materials. However, the aromatic polycarbonate resins are non-crystalline and hence molding process temperatures thereof are high and not good in melt fluidity.

There have been proposed various methods to improve melt fluidity and injection moldability of the aromatic polycarbonate resins without deteriorating their excellent characteristic properties.

For example, there has been proposed a method in which a copolymer obtained by polymerizing an aromatic vinyl monomer and a phenyl(meth)acrylate monomer is compounded in a polycarbonate resin (Patent Document 1).

By this method, melt fluidity at the time of shaping is improved, however, transparency and impact resistance of a thus obtained shaped article are insufficient and further improvement is desired.

In addition, there also has been proposed a method in which a copolymer having a functional group such as epoxy group is compounded in a polycarbonate resin (Patent Document 2).

However, there has been a problem such that transparency and impact resistance of a shaped article is lowered because deterioration is advanced by residence of a compounded substance of the polycarbonate resin with the copolymer having a functional group such as epoxy group during melt-kneading of the compounded substance owing to a high reactivity of the functional group.

Further, there has been proposed a method in which a styrene-acrylonitrile copolymer having a carboxyl group and a styrene-acrylonitrile copolymer having an epoxy group are compounded in an aromatic polycarbonate resin (Patent Document 3).

Although this method can improve fluidity at the time of shaping without deteriorating mechanical strength and thermal resistance of a thus obtained resin composition, there has been a problem such that this method cannot be applied to uses where transparency is required because transparency of a shaped article thus obtained is lowered.

Patent Document 1: International Publication No. WO 2005/030,819
Patent Document 2: Japanese Patent Application Laid-Open No. 2000-178,432
Patent Document 3: Japanese Patent Application Laid-Open No. Hei 06-306,230

DISCLOSURE OF THE INVENTION

Problem to be Solved by the Invention

It is an object of the present invention to provide a fluidity-improving agent capable of improving fluidity of an aromatic polycarbonate resin at the time of shaping without deteriorating the intrinsic characteristic properties of the aromatic polycarbonate resin, namely, transparency, resistance to exfoliation of surface layer, thermal resistance, impact resistance, and chemical resistance. It is another object of the present invention to provide an aromatic polycarbonate resin composition which is containing the fluidity-improving agent and excellent in fluidity. It is another object of the present invention to provide a shaped article of the aromatic polycarbonate resin composition.

Means to Solve the Problem

The present inventors have diligently researched to solve the above-mentioned subject and found that it is possible to improve fluidity of the aromatic polycarbonate resin at the time of shaping without deteriorating the intrinsic characteristic properties of the aromatic polycarbonate resin by using a polymer having a functional group (X) and a polymer having a functional group (Y) capable of reacting with the functional group (X) as a fluidity-improving agent and by melt-kneading the fluidity-improving agent with the aromatic polycarbonate resin.

More specifically, the fluidity-improving agent of the present invention is the one comprising 0.5 to 99.5 parts by mass of a polymer (A) which is obtained by polymerizing a monomer mixture (a) comprising 0.5 to 99% by mass of (a1) an aromatic vinyl monomer, 0.5 to 99% by mass of (a2) a phenyl(meth)acrylate or a phenyl(meth)acrylate having a substituent in a phenyl group, and 0.5 to 5% by mass of (a3) a vinyl monomer having a functional group (X), and 0.5 to 99.5 parts by mass of a polymer (B) which is obtained by polymerizing a monomer mixture (b) comprising (b1) a phenyl(meth)acrylate or a phenyl(meth)acrylate having a substituent in a phenyl group with a compound having a functional group (Y) capable of reacting with the functional group (X), with the proviso that a total of the polymer (A) and the polymer (B) is 100 parts by mass.

In addition, the fluidity-improving agent of the present invention is the one comprising 10 to 45 parts by mass of the aforementioned polymer (A), 10 to 45 parts by mass of the aforementioned polymer (B), and 10 to 80 parts by mass of a polymer (C) which is obtained by polymerizing a monomer mixture (c) comprising 0.5 to 99.5% by mass of (c1) an aromatic vinyl monomer and 0.5 to 99.5% by mass of (c2) a phenyl(meth)acrylate or a phenyl(meth)acrylate having a substituent in a phenyl group, with the proviso that a total of the polymers (A) to (C) is 100 parts by mass.

In addition, the fluidity-improving agent of the present invention is preferably the one which is obtained by reacting the functional group (X) possessed by the polymer (A) with the functional group (Y) possessed by the polymer (B).

It is preferable that the functional group (X) be an epoxy group and the functional group (Y) be a carboxyl group.

The aromatic polycarbonate resin composition of the present invention comprises 70 to 99.9% by mass of an aromatic polycarbonate resin and 0.1 to 30% by mass of the aforementioned fluidity-improving agent.

In addition, the aromatic polycarbonate resin composition of the present invention comprises 69.9 to 99.8% by mass of an aromatic polycarbonate resin, 0.1 to 30% by mass of the aforementioned fluidity-improving agent, and 0.1 to 30% by mass of a light diffusing agent.

The shaped article of the present invention is obtained by shaping the aforementioned aromatic polycarbonate resin composition.

Effect of the Invention

According to the fluidity-improving agent of the present invention, it can improve fluidity of an aromatic polycarbonate resin at the time of shaping without deteriorating the intrinsic characteristic properties of the aromatic polycarbonate resin, namely, transparency, resistance to exfoliation of surface layer, thermal resistance, impact resistance, and chemical resistance.

According to the aromatic polycarbonate resin composition of the present invention, a shaped article can be obtained with excellent fluidity of the aromatic polycarbonate resin composition at the time of shaping, and hence excellent performance for hard coated articles, glazing materials, light diffusing plates, optical disk substrates, and light guide plates can be realized.

The shaped article of the present invention has the intrinsic characteristic properties of aromatic polycarbonate resin and is useful for hard coated articles, glazing materials, light diffusing plates, optical disk substrates, and light guide plates.

BEST MODE FOR CARRYING OUT THE INVENTION

Figure 1:
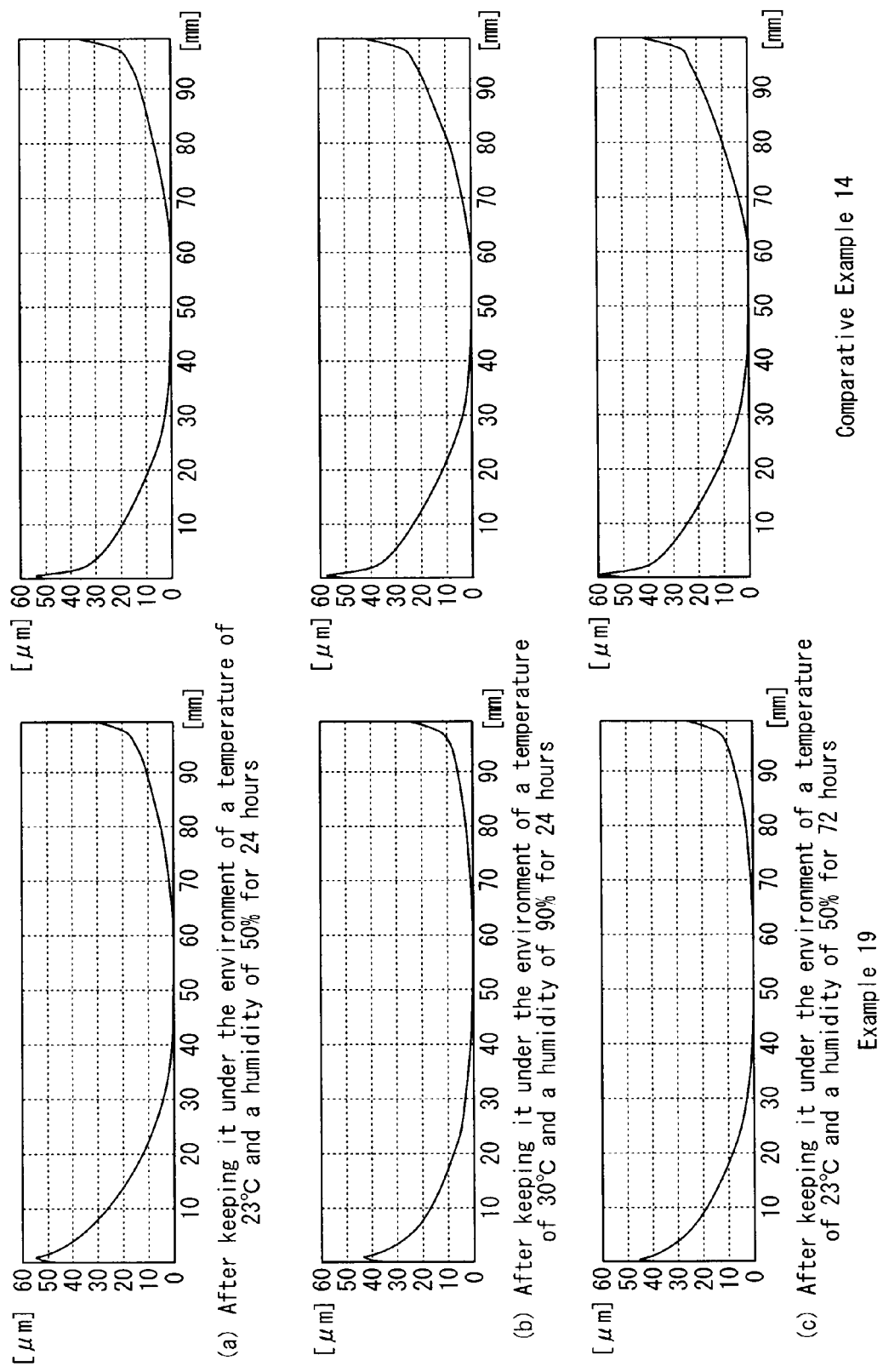
FIG. 1: A diagram illustrating the results of measurement of warp (Example 19 and Comparative Example 14).

The polymer (A) in the present invention is obtained by polymerizing a monomer mixture (a) comprising (a1) an aromatic vinyl monomer, (a2) a phenyl(meth)acrylate or a phenyl (meth)acrylate having a substituent in a phenyl group, and (a3) a vinyl monomer having a functional group (X).

As (a1) the aromatic vinyl monomer, for example, styrene, α-methyl styrene, p-methyl styrene, p-t-butyl styrene, p-methoxy styrene, o-methoxy styrene, 2,4-dimethyl styrene, chlorostyrene, bromostyrene, vinyl toluene, vinylnaphthalene, and vinylanthracene can be mentioned. These monomers can be used alone or in a combination of two or more kinds.

Among them, styrene, α-methyl styrene, and p-t-butyl styrene are preferable, and a combination of styrene and α-methyl styrene is more preferable because the refractive index of the polymer (A) gets near to that of the aromatic polycarbonate resin and hence the glass transition temperature of the polymer (A) becomes high.

When (a1) the aromatic vinyl monomer is a combination of styrene and α-methyl styrene, the content of α-methyl styrene in (a1) the aromatic vinyl monomer is preferably 10 to 70% by mass.

When the content of α-methyl styrene in (a1) the aromatic vinyl monomer is 10% by mass or more, the glass transition temperature of a thus obtained polymer becomes high and transparency of the thus obtained polymer at a high temperature becomes good. The content of α-methyl styrene is more preferably 20% by mass or more and furthermore preferably 30% by mass or more.

When the content of α-methyl styrene in (a1) the aromatic vinyl monomer is 70% by mass or less, copolymerizability does not become bad and rate of polymerization of the thus obtained polymer becomes high. The content of α-methyl styrene is more preferably 60% by mass or less and furthermore preferably 50% by mass or less.

As (a2) the phenyl(meth)acrylate or the phenyl(meth)acrylate having a substituent in a phenyl group, for example, phenyl(meth)acrylate, 4-t-butylphenyl(meth)acrylate, bromophenyl(meth)acrylate, dibromophenyl(meth)acrylate, 2,4,6-tribromophenyl(meth)acrylate, monochlorophenyl(meth)acrylate, dichlorophenyl(meth)acrylate, and trichlorophenyl(meth)acrylate can be mentioned. These monomers can be used alone or in a combination of two or more kinds.

Among them, phenyl(meth)acrylate is preferable because compatibility with the aromatic polycarbonate resin is high and resistance to exfoliation of surface layer of the resultant shaped article is not deteriorated.

Note that, "(meth)acryl" means "acryl" or "methacryl" in the present description.

As the functional group (X) possessed by (a3) the vinyl monomer of the present invention, for example, an epoxy group, carboxyl group, hydroxyl group, and amino group can be mentioned.

As the vinyl monomer having the functional group (X), for example, glycidyl(meth)acrylate, (meth)acrylic acid, 2-hydroxyethyl(meth)acrylate, and dimethylaminoethyl(meth)acrylate can be mentioned.

Among these functional groups (X), the epoxy group is preferable because reactivity with the polymer (B) in the melt-kneading process is good. As the vinyl monomer having the epoxy group, glycidyl(meth)acrylate can be mentioned.

The content of (a1) the aromatic vinyl monomer in the monomer mixture (a) which is 100% by mass is 0.5 to 99% by mass, the content of (a2) the phenyl(meth)acrylate or the phenyl(meth)acrylate having a substituent in a phenyl group is 0.5 to 99% by mass, and the content of (a3) the vinyl monomer having a functional group (X) is 0.5 to 5% by mass.

When the content of (a1) the aromatic vinyl monomer in the monomer mixture (a) which is 100% by mass is 0.5% by mass or more, the resultant fluidity-improving agent becomes incompatible with the aromatic polycarbonate resin and hence fluidity of the aromatic polycarbonate resin at the time of shaping is improved and chemical resistance of the resultant shaped article is not deteriorated. The content of (a1) the aromatic vinyl monomer is preferably 40% by mass or more and more preferably 60% by mass or more.

When the content of (a1) the aromatic vinyl monomer in the monomer mixture (a) which is 100% by mass is 99% by mass or less, resistance to exfoliation of surface layer and mechanical characteristics of the resultant shaped article are not deteriorated. The content of (a1) the aromatic vinyl monomer is preferably 95% by mass or less.

When the content of (a2) the phenyl(meth)acrylate or the phenyl(meth)acrylate having a substituent in a phenyl group in the monomer mixture (a) which is 100% by mass is 0.5% by mass or more, resistance to exfoliation of surface layer and mechanical characteristics of the resultant shaped article are not deteriorated. The content of (a2) the phenyl(meth)acrylate or the phenyl(meth)acrylate having a substituent in a phenyl group is preferably 5% by mass or more.

When the content of (a2) the phenyl(meth)acrylate or the phenyl(meth)acrylate having a substituent in a phenyl group in the monomer mixture (a) which is 100% by mass is 99% by mass or less, the resultant fluidity-improving agent becomes incompatible with the aromatic polycarbonate resin and hence fluidity of the aromatic polycarbonate resin at the time of shaping is improved and chemical resistance of the resultant shaped article is not deteriorated. The content of (a2) the phenyl(meth)acrylate or the phenyl(meth)acrylate having a substituent in a phenyl group is preferably 60% by mass or less and more preferably 40% by mass or less.

When the content of (a3) the vinyl monomer having a functional group (X) in the monomer mixture (a) which is 100% by mass is 0.5% by mass or more, the resultant fluidity-improving agent is not decomposed at the time of melt-kneading with the aromatic polycarbonate resin and fluidity of the aromatic polycarbonate resin is improved.

When the content of (a3) the vinyl monomer having a functional group (X) in the monomer mixture (a) which is 100% by mass is 5% by mass or less, there is not caused any deterioration attributed to residence at the time of melt-kneading with the aromatic polycarbonate resin and fluidity of the aromatic polycarbonate resin is improved. The content of (a3) the vinyl monomer is preferably 2.5% by mass or less.

The monomer mixture (a) may contain (a4) another monomer copolymerizable with the monomers (a1) to (a3), if necessary.

As (a4) the other monomer, for example, alkyl (meth)acrylates such as methyl (meth)acrylate, ethyl (meth)acrylate, butyl (meth)acrylate, 2-ethylhexyl (meth)acrylate, lauryl (meth)acrylate, stearyl (meth)acrylate, cyclohexyl (meth)acrylate, isobornyl (meth)acrylate, and t-butylcyclohexyl (meth)acrylate; benzyl (meth)acrylate; multifunctional monomers such as allyl (meth)acrylate, 1,3-butylene glycol di(meth)acrylate, and divinylbenzene; vinyl benzoate; vinyl acetate; maleic anhydride; maleimide compounds such as N-phenylmaleimide and cyclohexylmaleimide; and ethylenically unsaturated monomers having piperidinyl groups can be mentioned. These monomers can be used alone or in a combination of two or more kinds.

The content of (a4) the other monomer in the monomer mixture (a) which is 100% by mass is 0 to 40% by mass.

When the content of (a4) the other monomer in the monomer mixture (a) which is 100% by mass is 40% by mass or less, fluidity at the time of shaping is improved and chemical resistance of the resultant shaped article is not deteriorated.

It is preferable that the polymer (A) be incompatible with an aromatic polycarbonate resin and the refractive index thereof be close to that of the aromatic polycarbonate resin.

Compatibility of a polymer with the aromatic polycarbonate resin is confirmed as follows.

A test piece is prepared by injection molding of a resin composition obtained by compounding 95 parts by mass of an aromatic polycarbonate resin and 5 parts by mass of a polymer, and an image of a Transmission Electron Microscope, hereinafter represented as "TEM", of the test piece is taken, and the image thus taken is subjected to an image analysis.

When the polymer dispersing in a matrix of the aromatic polycarbonate resin is observed as a separated phase as a domain with a volume average domain radius, represented as dv, of 0.05 μm or larger, it is judged that the polymer is incompatible with the aromatic polycarbonate resin. When the polymer is not observed as a separated phase as a domain with a volume average domain radius, represented as dv, of 0.05 μm or larger, it is judged that the polymer is compatible with the aromatic polycarbonate resin.

For the image analysis of the TEM image at the time of calculating the volume average domain radius, represented as dv, for example, an image analysis software such as Image-ProPlus Ver. 4.0 for Windows, trade name, can be used.

With the image analysis, every domain area $R_j$, j being 1 to n, is obtained for all domains of n pieces in the TEM image and a radius $d_j$, j being 1 to n, in terms of a perfect circle converted from the domain area according to the following equation 1 is calculated.

$$d_j = ((4/\pi) \times R_j)^{1/2} \qquad \text{Equation 1}$$

In the next place, the volume average domain radius, represented as dv, is calculated from the radius $d_j$, using the following equation 2.

Specifically, the calculation method described in J. Macromol. Sci. -Phys., B38 (5& 6), 527, 1999 is used.

$$dv = (\Sigma d_j^3/n)^{1/3} \qquad \text{Equation 2}$$

The domain of the polymer in the test piece is oriented in a flow direction because a flow is applied on the test piece to be obtained by injection molding. Therefore, there sometimes appears anisotropy in the volume average domain radius, represented as dv, to be calculated by the image analysis of the TEM image. Consequently, in the present invention, a thin slice for the TEM image observation is cut out from the surface orthogonal to the flow direction.

As the method for polymerization to obtain the polymer (A) of the present invention, for example, an emulsion polymerization method, suspension polymerization method, solution polymerization method, and bulk polymerization method can be mentioned, however, the suspension polymerization method and the emulsion polymerization method are preferable from the viewpoint of easiness in a recovery method. However, in the case of the emulsion polymerization method, it is preferable to recover the polymer (A) by acid coagulation, using a carboxylic acid emulsifier or by salt coagulation with a salt such as calcium acetate, using a non-ion-anion emulsifier such as phosphate ester because it is apprehended that salts remaining in the polymer (A) cause decomposition of an aromatic polycarbonate resin.

As a polymerization initiator, for example, an organic peroxide, persulfate, redox initiator composed of a combination of a reducing agent and an organic peroxide or persulfate, and azo compound can be mentioned.

The amount of the functional group (X) of the polymer (A) is 0.01 to 0.2 mmol/g and preferably 0.03 to 0.1 mmol/g.

When the amount of the functional group (X) of the polymer (A) is 0.01 mmol/g or more, reactivity with the polymer (B) becomes sufficient, so that resistance to exfoliation of surface layer and mechanical characteristics of the resultant shaped article are not deteriorated.

When the amount of the functional group (X) of the polymer (A) is 0.2 mmol/g or less, there is not caused any deterioration attributed to residence at the time of melt-kneading with an aromatic polycarbonate resin and fluidity of the aromatic polycarbonate resin is improved.

The mass average molecular weight of the polymer (A) is 5,000 or more, preferably 10,000 or more, more preferably 15,000 or more, furthermore preferably 30,000 or more, and particularly preferably 40,000 or more. In addition, the mass average molecular weight of the polymer (A) is 200,000 or less, preferably 170,000 or less, more preferably 150,000 or less, furthermore preferably 120,000 or less, and particularly preferably 100,000 or less.

When the mass average molecular weight of the polymer (A) is 5,000 or more, the amount of a low molecular weight compound is relatively small, so that thermal resistance of a resultant shaped article is not deteriorated. In addition, poor appearance of the shaped article caused by a smoke emission at the time of melt-kneading does not occur. When a shaped article good in transparency at a high temperature, namely, a shaped article having a small temperature dependence of transparency, is necessary, the higher mass average molecular weight of the polymer is preferable.

When the mass average molecular weight of the polymer (A) is 200,000 or less, melt viscosity of a resultant aromatic polycarbonate resin composition does not become high, so that sufficient improving effect in melt fluidity can be obtained.

The polymer (B) in the present invention is obtained by polymerizing a monomer mixture (b) comprising (b1) a phenyl(meth)acrylate or a phenyl(meth)acrylate having a substituent in a phenyl group with a compound having a functional group (Y) capable of reacting with the functional group (X).

As (b1) the phenyl(meth)acrylate or the phenyl(meth)acrylate having a substituent in a phenyl group, the same monomers as in the case of the aforementioned monomer (a2) can be used. These monomers can be used alone or in a combination of two or more kinds.

Among them, phenyl(meth)acrylate is preferable because compatibility with an aromatic polycarbonate resin is high and resistance to exfoliation of surface layer of a resultant shaped article is not deteriorated.

The content of (b1) the phenyl(meth)acrylate or the phenyl (meth)acrylate having a substituent in a phenyl group in the monomer mixture (b) which is 100% by mass is 0.5 to 100% by mass.

When the content of (b1) the phenyl(meth)acrylate or the phenyl(meth)acrylate having a substituent in a phenyl group in the monomer mixture (b) which is 100% by mass is 0.5% by mass or more, resistance to exfoliation of surface layer and -mechanical characteristics of the resultant shaped article are not deteriorated. The content of (b1) the phenyl(meth)acrylate or the phenyl(meth)acrylate having a substituent in a phenyl group is preferably 25% by mass or more and more preferably 60% by mass or more.

The monomer mixture (b) may contain (b2) another monomer copolymerizable with the monomer (b1), if necessary.

As (b2) the other monomer, for example, aromatic vinyl monomers such as styrene and α-methyl styrene; alkyl (meth) acrylates such as methyl (meth)acrylate, ethyl (meth)acrylate, butyl (meth)acrylate, 2-ethylhexyl (meth)acrylate, lauryl (meth)acrylate, stearyl (meth)acrylate, cyclohexyl (meth) acrylate, isobornyl (meth)acrylate, and t-butylcyclohexyl (meth)acrylate; benzyl(meth)acrylate; vinyl monomers having functional groups such as 2-hydroxyethyl(meth)acrylate, N-methylol acrylamide, and methacryloyloxyethyl isocyanate; multifunctional monomers such as allyl(meth)acrylate, 1,3-butylene glycol di(meth)acrylate, and divinyl benzene; vinyl benzoate; vinyl acetate; maleic anhydride; maleimide compounds such as N-phenylmaleimide and cyclohexylmaleimide; polycaprolactone macromonomer; and ethylenically unsaturated monomers having piperidinyl groups can be mentioned. These monomers can be used alone or in a combination of two or more kinds.

The content of (b2) the other monomer in the monomer mixture (b) which is 100% by mass is 0 to 99.5% by mass.

When the content of (b2) the other monomer in the monomer mixture (b) which is 100% by mass is 99.5% by mass or less, fluidity at the time of shaping is improved and chemical resistance of the resultant shaped article is not deteriorated. The content of (b2) the other monomer is preferably 75% by mass or less and more preferably 40% by mass or less.

When the functional group (X) is an epoxy group, as the functional group (Y), for example, a carboxyl group, hydroxyl group, and methylol group can be mentioned. Among them, the carboxyl group is preferable because it has a good reactivity with the epoxy group.

When the functional group (X) is a carboxyl group, as the functional group (Y), for example, a hydroxyl group and isocyanate group can be mentioned.

When the functional group (X) is a hydroxyl group, as the functional group (Y), for example, an isocyanate group can be mentioned.

When the functional group (X) is an amino group, as the functional group (Y), for example, a carboxyl group can be mentioned.

When the functional group (Y) is a carboxyl group, the polymer (B) can be obtained by polymerizing the monomer mixture (b) with a compound having the carboxyl group.

As the compound having the carboxyl group, for example, a monomer having a carboxyl group such as (meth)acrylic acid; a chain transfer agent having a carboxyl group such as 3-mercaptopropionic acid; a polymerization initiator having a carboxyl group such as 4,4'-azobis(4-cyanovaleric acid) or 2,2'-azobis[N-(2-carboxyethyl)-2-methyl-propionamidine] can be mentioned. These compounds can be used alone or in a combination of two or more kinds.

Among them, the chain transfer agent having a carboxyl group and the polymerization initiator having a carboxyl group are preferable because a carboxyl group can be effectively introduced into a terminal of the polymer (B).

As the polymer (B), a phenyl methacrylate polymer in which 3-mercaptopropionic acid has been used as the chain transfer agent or a phenyl methacrylate-methyl methacrylate copolymer in which 3-mercaptopropionic acid has been used as the chain transfer agent and the content of the phenyl methacrylate is 90% by mass or more is preferable.

The polymer (B) is compatible with an aromatic polycarbonate resin.

In other words, the polymer (B) dispersing in a matrix of the aromatic polycarbonate resin is not observed as a separated phase as a domain with a volume average domain radius, represented as dv, of 0.05 μm or larger.

As the method for polymerization to obtain the polymer (B), the same methods as in the case of the polymer (A) can be used.

The amount of the functional group (Y) of the polymer (B) is 0.02 to 0.5 mmol/g and preferably 0.05 to 0.3 mmol/g.

When the amount of the functional group (Y) of the polymer (B) is 0.02 mmol/g or more, reactivity with the polymer (A) becomes sufficient, so that a refined domain of the polymer is formed in a matrix of the aromatic polycarbonate resin and the resultant shaped article has a high degree of transparency.

When the amount of the functional group (Y) of the polymer (B) is 0.5 mmol/g or less, hydrolysis and thermal decomposition do not occur at the time of melt-kneading.

The mass average molecular weight of the polymer (B) is 5,000 or more and preferably 10,000 or more. In addition, the mass average molecular weight of the polymer (B) is 200,000 or less, preferably 120,000 or less, more preferably 100,000 or less, and furthermore preferably 50,000 or less.

When the mass average molecular weight of the polymer (B) is 5,000 or more, the amount of a low molecular weight compound is relatively small, so that thermal resistance of the resultant shaped article is not deteriorated. In addition, poor appearance of the shaped article caused by a smoke emission at the time of melt-kneading does not occur.

When the mass average molecular weight of the polymer (B) is 200,000 or less, compatibility with an aromatic polycarbonate resin is not lowered and appearance of the resultant shaped article becomes good.

The content of the polymer (A) in the fluidity-improving agent is 0.5 to 99.5 parts by mass and preferably 30 to 70 parts by mass. The content of the polymer (B) in the fluidity-improving agent is 0.5 to 99.5 parts by mass and preferably 30 to 70 parts by mass. Note that, the total of the polymer (A) and the polymer (B) is 100 parts by mass.

The amount of the functional group (X) in the fluidity-improving agent is preferably lower than that of the functional group (Y) in the fluidity-improving agent.

The polymer (C) in the present invention is obtained by polymerizing a monomer mixture (c) comprising (c1) an aromatic vinyl monomer and (c2) a phenyl(meth)acrylate or a phenyl(meth)acrylate having a substituent in a phenyl group.

As (c1) the aromatic vinyl monomer, the same monomers as in the case of the aforementioned aromatic vinyl monomer (a1) can be used. These monomers can be used alone or in a combination of two or more kinds.

Among them, styrene, α-methyl styrene, and p-t-butyl styrene are preferable and a combination of styrene and α-methyl styrene is more preferable because the refractive index of the polymer (C) gets near to that of the aromatic polycarbonate resin and hence the glass transition temperature of the polymer (C) becomes high.

When (c1) the aromatic vinyl monomer is a combination of styrene and α-methyl styrene, the content of α-methyl styrene in (c1) the aromatic vinyl monomer is preferably 10 to 70% by mass.

When the content of α-methyl styrene in (c1) the aromatic vinyl monomer is 10% by mass or more, the glass transition temperature of a thus obtained polymer becomes high and transparency of the thus obtained polymer at a high temperature becomes good. The content of α-methyl styrene in (c1) the aromatic vinyl monomer is more preferably 20% by mass or more and furthermore preferably 30% by mass or more.

When the content of α-methyl styrene in (c1) the aromatic vinyl monomer is 70% by mass or less, copolymerizability does not become bad and rate of polymerization of the thus obtained polymer becomes high. The content of α-methyl styrene in (c1) the aromatic vinyl monomer is more preferably 60% by mass or less and furthermore preferably 50% by mass or less.

As (c2) the phenyl(meth)acrylate or the phenyl(meth)acrylate having a substituent in a phenyl group, the same monomers as in the case of the aforementioned monomer (a2) can be used. These monomers can be used alone or in a combination of two or more kinds.

Among them, phenyl(meth)acrylate is preferable because compatibility with the aromatic polycarbonate resin is high and resistance to exfoliation of surface layer of the resultant shaped article is not deteriorated.

The content of (c1) the aromatic vinyl monomer in the monomer mixture (c) which is 100% by mass is 0.5 to 99.5% by mass and the content of (c2) the phenyl(meth)acrylate or the phenyl(meth)acrylate having a substituent in a phenyl group is 0.5 to 99.5% by mass.

When the content of (c1) the aromatic vinyl monomer in the monomer mixture (c) which is 100% by mass is 0.5% by mass or more, the resultant fluidity-improving agent becomes incompatible with the aromatic polycarbonate resin and hence fluidity at the time of shaping is improved and chemical resistance of the resultant shaped article is not deteriorated. The content of (c1) the aromatic vinyl monomer in the monomer mixture (c) which is 100% by mass is preferably 40% by mass or more and more preferably 60% by mass or more.

When the content of (c1) the aromatic vinyl monomer in the monomer mixture (c) which is 100% by mass is 99.5% by mass or less, resistance to exfoliation of surface layer and mechanical characteristics of the resultant shaped article are not deteriorated. The content of (c1) the aromatic vinyl monomer in the monomer mixture (c) which is 100% by mass is preferably 95% by mass or less When the content of (c2) the phenyl(meth)acrylate or the phenyl(meth)acrylate having a substituent in a phenyl group in the monomer mixture (c) which is 100% by mass is 0.5% by mass or more, resistance to exfoliation of surface layer and mechanical characteristics of the resultant shaped article are not deteriorated. The content of (c2) the phenyl(meth)acrylate or the phenyl(meth)acrylate having a substituent in a phenyl group is preferably 5% by mass or more.

When the content of (c2) the phenyl(meth)acrylate or the phenyl(meth)acrylate having a substituent in a phenyl group in the monomer mixture (c) which is 100% by mass is 99.5% by mass or less, the resultant fluidity-improving agent becomes incompatible with the aromatic polycarbonate resin and hence fluidity at the time of shaping is improved and chemical resistance of the resultant shaped article is not deteriorated. The content of (c2) the phenyl(meth)acrylate or the phenyl(meth)acrylate having a substituent in a phenyl group is preferably 60% by mass or less and more preferably 40% by mass or less.

The monomer mixture (c) may contain (c3) another monomer copolymerizable with the monomers (c1) and (c2), if necessary.

As (c3) the other monomer, the same monomers as in the case of the aforementioned monomer (a4) can be used. These monomers can be used alone or in a combination of two or more kinds.

The content of (c3) the other monomer in the monomer mixture (c) which is 100% by mass is 0 to 40% by mass.

When the content of (c3) the other monomer in the monomer mixture (c) which is 100% by mass is 40% by mass or less, fluidity at the time of shaping is improved and chemical resistance of the resultant shaped article is not deteriorated.

The polymer (C) is preferably incompatible with the aromatic polycarbonate resin and the refractive index of the polymer (C) preferably gets near to that of the aromatic polycarbonate resin.

In other words, the polymer (C) dispersing in a matrix of the aromatic polycarbonate resin is observed as a separated phase as a domain with a volume average domain radius, represented as dv, of 0.05 µm or larger.

As the method for polymerization to obtain the polymer (C), the same methods as in the case of the polymer (A) can be used.

The mass average molecular weight of the polymer (C) is 5,000 or more, preferably 10,000 or more, and more preferably 15,000 or more. In addition, the mass average molecular weight of the polymer (C) is 200,000 or less, preferably 120,000 or less, and more preferably 100,000 or less.

When the mass average molecular weight of the polymer (C) is 5,000 or more, the amount of a low molecular weight compound is relatively small, so that thermal resistance of the resultant shaped article is not deteriorated. In addition, poor appearance of the shaped article caused by a smoke emission at the time of melt-kneading does not occur.

When the mass average molecular weight of the polymer (C) is 200,000 or less, melt viscosity of a resultant aromatic polycarbonate resin composition does not become high, so that sufficient improving effect in melt fluidity can be obtained.

The fluidity-improving agent of the present invention may contain the polymer (C).

When the polymer (C) is contained, the content of the polymer (A) in the fluidity-improving agent is 10 to 45 parts by mass, the content of the polymer (B) is 10 to 45 parts by mass, and the content of the polymer (C) is 10 to 80 parts by mass. Note that, the total of the polymers (A) to (C) is 100 parts by mass.

When the content of the polymer (C) in the fluidity-improving agent (100 parts by mass) is 45 parts by mass or less, transparency of the resultant shaped article is not deteriorated and fluidity at the time of shaping is further improved.

It is preferable that the fluidity-improving agent contain the polymers (A) to (C) such that the ratio of these polymers make an average refractive index of the polymers (A) to (C) become near to the refractive index of the aromatic polycarbonate resin.

By compounding the fluidity-improving agent of the present invention with an aromatic polycarbonate resin and melt kneading a resultant mixture, the functional group (X) possessed by the polymer (A) reacts with the functional group (Y) possessed by the polymer (B). Through the reaction between the functional group (X) and the functional group (Y), the fluidity-improving agent is changed to exhibit an action of phase separation against the aromatic polycarbonate resin and to realize improving effect in fluidity at the time of shaping.

After the shaping, a refined domain of the fluidity-improving agent is formed in a matrix of the aromatic polycarbonate resin. As a result, the fluidity-improving agent can improve fluidity of the aromatic polycarbonate resin at the time of shaping without deteriorating the intrinsic characteristic properties of the aromatic polycarbonate resin, namely, transparency, resistance to exfoliation of surface layer, thermal resistance, impact resistance, and chemical resistance.

To compound the fluidity-improving agent of the present invention with the aromatic polycarbonate resin, the following method (I) or (II) can be used.

(I): The fluidity-improving agent compounded with the polymer (A), the polymer (B), and, if necessary, the polymer (C) is subjected to compounding and melt-kneading together with the aromatic polycarbonate resin.

(II): The fluidity-improving agent compounded with the polymer (A), the polymer (B), and, if necessary, the polymer (C) is subjected to melt-kneading to cause a reaction between the functional group (X) and the functional group (Y), and then compounded with the aromatic polycarbonate resin and further subjected to melt-kneading.

In addition, a method in which the polymer (B) is compounded and further subjected to melt-kneading after the polymer (A) has been compounded with the aromatic polycarbonate resin and subjected to melt-kneading, or a method in which the aromatic polycarbonate resin is compounded with a masterbatch of the fluidity-improving agent and the aromatic polycarbonate resin and subjected to melt-kneading after the masterbatch of the fluidity-improving agent and the aromatic polycarbonate resin has been prepared can also be used.

As the aromatic polycarbonate resin to be used in the present invention, those produced with conventional methods can be used.

When the aromatic polycarbonate resin is 2,2-bis(4-hydroxyphenyl)propane-derived polycarbonate, as the method for production thereof, for example, a method in which 2,2-bis(4-hydroxyphenyl)propane is used as a raw material and phosgene is blown into it in the presence of an aqueous alkaline solution and a solvent; and a method in which 2,2-bis(4-hydroxyphenyl)propane and a diester carbonate are subjected to transesterification in the presence of a catalyst can be mentioned.

The aromatic polycarbonate resin composition, which is 100% by mass, of the present invention contains 70 to 99.9% by mass of an aromatic polycarbonate resin and 0.1 to 30% by mass of the fluidity-improving agent of the present invention.

The content of the fluidity-improving agent in the aromatic polycarbonate resin composition which is 100% by mass is preferably 0.5% by mass or more, more preferably 1% by mass or more, and furthermore preferably 3% by mass or more. The content of the fluidity-improving agent in the aromatic polycarbonate resin composition which is 100% by mass is preferably 20% by mass or less.

When the content of the fluidity-improving agent in the aromatic polycarbonate resin composition which is 100% by mass is 0.1% by mass or more, fluidity at the time of shaping is sufficiently improved.

When the content of the fluidity-improving agent in the aromatic polycarbonate resin composition which is 100% by mass is 30% by mass or less, mechanical characteristics of the aromatic polycarbonate resin is not deteriorated.

The aromatic polycarbonate resin composition of the present invention may contain a light diffusing agent.

As the light diffusing agent, for example, inorganic fine particles such as glass filler, calcium carbonate, barium sulfate, silica, talc, mica, wollastonite, and titanium oxide; and polymer fine particles such as organic crosslinked particles obtained by polymerizing a non-crosslinking monomer and a crosslinking monomer, silicone crosslinked particles, non-crystalline heat resistant polymer particles like polyether sulfone particles, epoxy resin particles, urethane resin particles, melamine resin particles, benzoguanamine resin particles, and phenol resin particles can be mentioned.

As the light diffusing agent, polymer fine particles are preferable to inorganic fine particles. Compatibility between light diffusing properties and total light transmittance can be realized in a higher level by using the polymer fine particles.

Refractive indexes of the polymer fine particles are usually about 1.33 to 1.7. When the refractive indexes of the polymer fine particles are in this range, sufficient light diffusing function can be realized when they are compounded in a resin composition.

The average particle diameter of the light diffusing agent is preferably 0.01 to 50 µm, more preferably 0.1 to 10 µm, and furthermore preferably 0.1 to 8 µm. The average particle diameter can be represented by 50% integrated distribution of particle size, represented as D50, with a laser light-scattering method.

As the light diffusing agent, one with a narrow particle-size distribution is preferable, and one in which fine particles having a diameter in the range of the average particle diameter ±2 µm occupy 70% by mass or more of the total fine particles in the particle-size distribution is more preferable.

The absolute value of the difference in refractive index between the light diffusing agent and the aromatic polycarbonate resin is preferably 0.02 to 0.2. When the difference in refractive index is in this range, light diffusing properties and total light transmittance can be made compatible in a high level. It is more preferable that the refractive index of the light diffusing agent be lower than that of the aromatic polycarbonate resin.

When the light diffusing agent is contained in the aromatic polycarbonate resin composition, the aromatic polycarbonate resin composition, which is 100% by mass, of the present invention contains 69.9 to 99.8% by mass of the aromatic polycarbonate resin, 0.1 to 30% by mass of the fluidity-improving agent of the present invention, and 0.1 to 30% by mass of the light diffusing agent.

When the content of the light diffusing agent is 0.1 to 30% by mass in the aromatic polycarbonate resin composition which is 100% by mass, sufficient light diffusing function can be realized.

The aromatic polycarbonate resin composition of the present invention may be compounded with conventional additives such as stabilizer, reinforcing agent, impact resistance modifier, and flame retardant, if necessary. For example, a glass fiber, carbon fiber, and potassium titanate fiber can be contained to improve strength, stiffness, and flame resistance of a resultant shaped article. Further, an engineering plastic composition such as polyethylene terephthalate for improvement of chemical resistance and a rubber-like elastomer for improvement of impact resistance can be compounded.

The aromatic polycarbonate resin composition of the present invention is prepared by a conventional method in which the fluidity-improving agent, an aromatic polycarbonate resin, and, if necessary, a light diffusing agent are compounded and kneaded using, for example, Henschel mixer, Banbury mixer, a single screw extruder, twin screw extruder, two roles, kneader, and brabender.

The shaped article of the present invention is obtained by shaping the aromatic polycarbonate resin composition of the present invention with a conventional method such as injection molding method, extrusion molding method, compression molding method, blow molding method, and cast molding method. The aromatic polycarbonate resin composition of the present invention is particularly useful as a raw material for injection molded articles.

The shaped article of the present invention can be applied for a variety of uses such as hard coated articles, glazing materials, light diffusing plates, optical disk substrates, light guide plates, medical materials, and sundries.

In the next place, the hard coated article of the present invention will be explained.

The hard coated article of the present invention is one in which a hard coat layer is provided on a surface of a shaped article obtained by shaping the aforementioned aromatic polycarbonate resin composition.

The hard coat layer can be formed by coating a hard coating material on the surface of the shaped article obtained by shaping the aromatic polycarbonate resin composition followed by curing the hard coating material.

As the hard coating material, for example, silicone hard coating materials and other organic resin type hard coating materials can be mentioned.

The silicone hard coating material is one which forms a cured resin layer having a siloxane bond. As the silicone hard coating material, for example, a partial hydrolysis-condensation product of a compound containing a compound such as trialkoxysilane compound corresponding to a trifunctional siloxane unit as an essential component, a partial hydrolysis-condensation product of a compound containing a compound corresponding to a trifunctional siloxane unit and a compound such as tetraalkoxysilane compound corresponding to a tetrafunctional siloxane unit, and a partial hydrolysis-condensation product of a mixture of these partial hydrolysis-condensation products and metal oxide fine particles such as colloidal silica can be mentioned.

As the other organic resin type hard coating material, for example, a melamine resin, urethane resin, alkyd resin, acrylic resin, and multifunctional acrylic resin can be mentioned. Among them, monomers or oligomers are preferable such as a monofunctional or multifunctional (meth)acrylate like an urethane (meth)acrylate, epoxy (meth)acrylate, polyester (meth)acrylate, and organic-inorganic hybrid (meth) acrylate obtained by condensating colloidal silica and (meth) acryloyl alkoxysilane; and an organic-inorganic hybrid vinyl compound.

The coating of the hard coating material on a shaped article can be carried out by properly selecting a coating method from conventional coating methods such as bar coating method, a dip coating method, flow coating method, spray coating method, spin coating method, and roller coating method, depending on a shape of the shaped article. Among them, dip coating method, flow coating method, and spray coating method are preferable because these methods can easily cope with complicated shapes and can easily control thickness of coating films.

Curing of the hard coating material can be carried out by vaporizing an organic solvent when the organic solvent is used followed by irradiating an active energy ray such as ultraviolet ray or electron beam, or by heating, or both of them.

The hard coated article explained so far is excellent in shaping properties because it is composed of the aromatic polycarbonate resin composition having high melt fluidity without deteriorating the intrinsic characteristic properties of the aromatic polycarbonate resin, namely, transparency, resistance to exfoliation of surface layer, thermal resistance, impact resistance, and chemical resistance.

The hard coated article of the present invention is useful in various uses such as various electric and electronic equipment, OA appliances, automotive parts, machine parts, agricultural materials, fishery materials, transport containers, packaging containers, toys, and sundries because it is excellent in transparency, thermal resistance, impact resistance, and appearance. In addition, it is suitable for building and automotive glazing materials such as front door windows (window shields), rear door windows, quarter windows, back windows, back door windows, sun roofs, roof panels, and various window materials because it is possible to make it large-sized, light and thin-walled, shape-complicated, and high-performanced.

In the next place, the light diffusing plate of the present invention will be explained.

The light diffusing plate of the present invention can usually be produced by a conventional injection molding method from the aforementioned resin composition.

The aromatic polycarbonate resin composition of the present invention is particularly proper for production of large-sized and thin-walled light diffusing plates, in particular, those for image display devices. The light diffusing plate having a surface area of 500 to 50,000 $cm^2$ can be obtained by the aromatic polycarbonate resin composition of the present invention. The surface area of the light diffusing plate is preferably 1,000 to 25,000 $cm^2$, and the thickness of the light diffusing plate is preferably 0.3 to 3 mm. As described above, large-sized, highly dimensionally stable, and thin-walled (light weight) light diffusing plates can be produced by the aromatic polycarbonate resin composition of the present invention.

The light diffusing plate may be a single layer plate having a surface shape such as Fresnel lens shape or cylindrical lens shape, or may be a laminated plate obtained by laminating another material having a surface shape such as Fresnel lens shape or cylindrical lens shape on the light diffusing plate.

The light diffusing plate explained so far is excellent in shaping properties because it is composed of the aromatic polycarbonate resin composition having high melt fluidity without deteriorating the intrinsic characteristic properties of the aromatic polycarbonate resin, namely, transparency, resistance to exfoliation of surface layer, thermal resistance, impact resistance, and chemical resistance.

In addition, the light diffusing plate of the present invention is excellent in chemical resistance and thus can be given a surface modification, and as a result, another function can be given to the light diffusing plate. The term "surface modification" means to provide a new layer on a surface of a shaped article having diffusivity of light by means of deposition such as physical deposition or chemical deposition; plating such as electroplating, electroless plating, or hot dip plating; painting; coating; or printing.

In the next place, the optical disk substrate of the present invention will be explained.

The optical disk substrate of the present invention can usually be produced from the aforementioned resin composition by melt shaping methods such as conventional injection molding methods including injection compression molding. In particular, the optical disk substrate of the present invention is suitable for the one to one side or both sides of which a groove or a pit is transferred by injection molding method using a stamper because the aforementioned resin composition is provided with a high melt fluidity and excellent in shaping properties such as transfer properties, and is applicable to a wide range of from a normal recording density to a high recording density.

The injection molding machine and the stamper to be used may be conventional ones, however, as a cylinder and a screw of the injection molding machine, it is preferable to use those composed of a material that has low adhesive properties with the resin composition and has corrosion resistance and wear resistance from the viewpoints of suppressing the generation of carbide originated from the resin composition and of increasing the credibility of the optical disk substrate.

In addition, the environment of a shaping step is preferably kept as clean as possible taking account of the object of the present invention, and further, it is important to remove moisture from the resin composition previous to the shaping step by sufficient drying or to take measures for preventing residence of the resin composition in a shaping machine so as not to cause melting and decomposition of the resin composition.

As for the optical disk, the specific laminate structure thereof is not particularly limited as long as the optical disk is provided with the optical disk substrate composed of the aforementioned resin composition. The optical disk can be exemplified by a form in which a reflective film, a recording layer, and a light transmitting layer are laminated on one side or both sides of the optical disk substrate, if necessary.

The optical disk substrate explained so far has good shaping properties such as transfer properties, and further, birefringence of a shaped product made therefrom is improved because it is composed of the aromatic polycarbonate resin composition having high melt fluidity without deteriorating the intrinsic characteristic properties of the aromatic polycarbonate resin, namely, transparency, resistance to exfoliation of surface layer, thermal resistance, impact resistance, and chemical resistance. Consequently, such an optical disk substrate is applicable to from an audio CD, having a recording density of about 650 MB per a disk and having a diameter of 12 cm, to a disk having a high recording density.

In the next place, the light guide plate of the present invention will be explained.

The light guide plate of the present invention can usually be produced from the aforementioned resin composition by conventional injection molding method.

The specific shape of the light guide plate is not particularly limited, however, the light guide plate can preferably be exemplified by one having a wedge-shaped cross-sectional shape in which one surface is an uniformly inclined plane having a convexo-concave pattern of a continuous prism shape and is a random reflection portion because the aforementioned resin composition has a high melt fluidity and can well transfer a fine convexo-concave pattern formed on a cavity of a mold for injection molding. Such a light guide plate can be produced using a mold for injection molding, on the cavity of which a convexo-concave portion is formed, by carrying out injection molding while transferring the convexo-concave portion. Note that, as a method for providing the convexo-concave portion on the cavity of the mold for injection molding, a method for forming the convexo-concave portion in a nested manner is easy and preferable.

By providing at least such a light guide plate and a light source that irradiates lights toward the light guide plate, an edge light type surface light source body to be used for mobile phones, portable terminals, cameras, watches, laptop personal computers, displays, lightings, signals, automobile rear lamps, and power displays of microwave cookers can be constructed. As the light source, a self-illuminant such as cold cathode fluorescent tube, LED, and organic EL besides a fluorescent lamp can be used.

The light guide plate explained so far is composed of the aromatic polycarbonate resin composition having high melt fluidity without deteriorating the intrinsic characteristic properties of the aromatic polycarbonate resin, namely, transparency, resistance to exfoliation of surface layer, thermal resistance, and chemical resistance, and can be applied to a variety of uses without any restriction in requisite environment for its use. Further, as for the light guide plate, a fine convexo-concave pattern formed on a cavity of a mold for injection molding can be sufficiently transferred and well shaped, and problems such as lowering of the brightness can be suppressed. Consequently, a surface light source body excellent in performance and having a high industrial value can be provided by using such a light guide plate.

EXAMPLES

Hereinafter, the present invention will be further specifically explained, however, the present invention is not limited to these examples.

In the examples, "part" and "%" mean "part by mass" and "% by mass", respectively.

(Measurement of Rate of Polymerization)

The rate of polymerization of polymer was measured in accordance with the following procedure.

1) The mass of an aluminum pan is measured to 0.1 mg order. (A)

2) About 1 g of the polymer is taken in the aluminum pan and the total mass of the polymer and the pan is measured to 0.1 mg order. (B)

3) The aluminum pan in which the polymer is contained is put in a dryer at a temperature of 180° C. and heated at this temperature for 45 minutes.

4) The aluminum pan in which the polymer is contained is taken out of the dryer, cooled in a desiccator to room temperature, and the total mass of the polymer and the pan is measured to 0.1 mg order. (C)

5) The solid content of the polymer is calculated with the following equation.

$$(C-A)/(B-A) \times 100 [\%]$$

6) The rate of polymerization of polymer is calculated by dividing the solid content thus calculated by the theoretical solid content at the time of charging.

(Measurement of Mass Average Molecular Weight Represented as Mw and Number Average Molecular Weight Represented as Mn)

The Mw and the Mn were measured in accordance with the following procedure.

They were obtained from a calibration curve based on a standard polystyrene using gel permeation chromatography. The measurement condition is as follows.

Column: TSK-GEL SUPER HZM-N, manufactured by Tosoh Corporation

Measuring temperature: 40° C.
Eluant: Chloroform
Flow rate of eluant: 0.6 ml/minute
Detector: RI (Measurement of the Amount of Epoxy Group)

The amount of epoxy group in the polymer (A) was determined in accordance with the following procedure.

1) Blank measurement 1-1) Ten milliliter of the following solution A is taken with a whole pipette and introduced into a 100 ml Erlenmeyer flask having a ground stopper.

Solution A: 0.1 N hydrochloric acid solution in a tetrahydrofuran/ethanol (1/1) mixture 1-2) The solution A thus taken is titrated with the following solution B using phenolphthalein as an indicator. The end point of the titration is defined such that faint red color of this solution continues for 30 seconds, and titer of the solution B at this point is determined as X (ml).

Solution B: 0.1 N alcoholic solution of potassium hydroxide

2) Measurement of the polymer (A)

2-1) The polymer (A) is taken in an amount of W (g) within the range from 4 to 7 g in a 100 ml Erlenmeyer flask having a ground stopper. To this flask, 30 ml of tetrahydrofuran (THF) is added to dissolve the polymer (A).

2-2) Ten milliliter of the solution A is taken with a whole pipette and introduced into the Erlenmeyer flask in which the solution of the polymer (A) is contained.

2-3) A condenser is attached to the Erlenmeyer flask and the flask is heated at 60° C. for 5 minutes.

2-4) After the Erlenmeyer flask is cooled, the contents are titrated with the solution B using phenolphthalein as an indicator. The end point of the titration is defined such that faint red color of this solution continues for 30 seconds, and titer of the solution B at this point is determined as Y (ml).

2-5) The amount of epoxy group in the polymer (A) is calculated to one decimal place with the following equation.

$$\text{The amount of epoxy group} = f \times 0.1 \times ((X-Y)/1000)/W \times 1000 \text{ (mmol/g)}$$

In the equation, f represents potency of the solution B.

(Measurement of the Amount of Carboxyl Group)

The amount of carboxyl group in the polymer (B) was determined in accordance with the following procedure.

1) The polymer (B) is taken in an amount of V (g) within the range from 12 to 15 g in a 200 ml Erlenmeyer flask having a ground stopper. To this flask, 100 ml of THF is added to dissolve the polymer (B).

2) The solution of the polymer (B) is titrated with the aforementioned solution B using phenolphthalein as an indicator. The end point of the titration is defined such that faint red color of this solution continues for 30 seconds, and titer of the solution B at this point is determined as Z (ml).

3) The amount of carboxyl group in the polymer (B) is calculated to one decimal place with the following equation.

$$\text{The amount of carboxyl group} = f \times 0.1 \times (Z/1000)/V \times 1000 \text{ (mmol/g)}$$

In the equation, f represents potency of the solution B.

(Compatibility of a Polymer)

Compatibility of a polymer with an aromatic polycarbonate resin is determined as follows.

Five parts of the polymer were compounded with 95 parts of the aromatic polycarbonate resin (Panlite L-1225WS, manufactured by Teijin Chemicals Ltd.) and the resultant mixture was molded into a test piece having a width of 50 mm, a length of 50 mm, and a thickness of 2 mm at a molding temperature of 280° C. and a mold temperature of 80° C. using an injection molding machine (IS-100, manufactured by Toshiba Machine Co., Ltd.).

A thin section was sliced off from a central portion of the test piece using a cryomicrotome, and the thin section was stained with ruthenium tetroxide or osmium tetroxide to obtain a sample for TEM observation. An optimum staining agent was selected depending on a kind of a functional group contained in the polymer.

A TEM image, having a magnification of 5,000 times, of the sample thus obtained was taken and a volume average domain radius, represented as dv, of the polymer dispersing in the aromatic polycarbonate resin was measured.

Production Example 1

Production of the Polymer (A-1)

To a separable flask equipped with a thermometer, a nitrogen introducing pipe, a condenser, and a stirring device, the following emulsifier mixture was charged and stirred, and the flask was heated to the inside temperature of 60° C. under a nitrogen atmosphere.

Emulsifier Mixture:

| | |
|---|---|
| Phosphanol RS-610Na (an anion emulsifier, manufactured by Kao Corporation) | 1.0 part |
| Deionized water | 293 parts |

Then, the following reducing agent mixture was introduced into the separable flask.

Reducing Agent Mixture:

| | |
|---|---|
| Ferrous sulfate | 0.0001 part |
| Disodium ethylenediaminetetraacetate | 0.0003 part |
| Rongalit | 0.3 part |
| Deionized water | 5 parts |

The following monomer mixture was dropped into the separable flask over the period of 180 minutes, and then, the contents were stirred for 60 minutes and polymerization was finished to obtain a latex of the polymer (A-1).

Monomer Mixture:

| | |
|---|---|
| Styrene | 55.0 parts |
| α-Methyl styrene | 24.0 parts |
| Phenyl methacrylate | 20.0 parts |
| Glycidyl methacrylate | 1.0 part |
| n-Octyl mercaptan | 0.5 part |
| t-Butyl hydroperoxide | 0.2 part |

Six hundred and twenty five parts of an aqueous solution in which 5 parts of calcium acetate was dissolved were heated to 83° C. and stirred. The latex of the polymer (A-1) thus obtained was gradually dropped into this solution. Then, the resultant solution was heated to 91° C. and kept at this temperature for 5 minutes to coagulate the latex. The coagulated matter was separated and washed, and dried at 75° C. for 24 hours to obtain the polymer (A-1).

The rate of polymerization of the polymer (A-1) was 95%, (Mw) was 52,000, (Mn) was 23,000, and the amount of epoxy group was 0.04 mmol/g.

The (dv) of the polymer (A-1) in the aromatic polycarbonate resin was 0.4 μm, and the polymer (A-1) was incompatible with the aromatic polycarbonate resin.

Production Example 2

Production of the Polymer (A')

The same procedure as in Production Example 1 was carried out except that the monomer mixture was changed to the following composition to obtain the polymer (A').

Monomer Mixture:

| | |
|---|---|
| Styrene | 50.0 parts |
| α-Methyl styrene | 24.0 parts |
| Phenyl methacrylate | 20.0 parts |
| Glycidyl methacrylate | 6.0 part |
| n-Octyl mercaptan | 0.5 part |
| t-Butyl hydroperoxide | 0.2 part |

The rate of polymerization of the polymer (A') was 95%, (Mw) was 52,000, (Mn) was 23,000, and the amount of epoxy group was 0.35 mmol/g.

The (dv) of the polymer (A') in the aromatic polycarbonate resin was 0.4 μm, and the polymer (A') was incompatible with the aromatic polycarbonate resin.

Production Example 3

Production of the Polymer (B-1)

To a separable flask equipped with a thermometer, a nitrogen introducing pipe, a condenser, and a stirring device, the following emulsifier mixture was charged and stirred, and the flask was heated to the inside temperature of 60° C. under a nitrogen atmosphere.

Emulsifier Mixture:

| | |
|---|---|
| Pelex SS-L (an anion emulsifier, manufactured by Kao Corporation) | 3.0 part |
| Deionized water | 291 parts |

Then, the following reducing agent mixture was introduced into the separable flask.

Reducing Agent Mixture:

| | |
|---|---|
| Ferrous sulfate | 0.0001 part |
| Disodium ethylenediaminetetraacetate | 0.0003 part |
| Rongalit | 0.3 part |
| Deionized water | 5 parts |

The following monomer mixture was dropped into the separable flask over the period of 180 minutes, and then, the contents were stirred for 60 minutes and polymerization was finished to obtain a latex of the polymer (B-1).

Monomer Mixture:

| | |
|---|---|
| Phenyl methacrylate | 100.0 parts |
| 3-Mercaptopropionic acid | 1.0 part |
| t-Butyl hydroperoxide | 0.2 part |

Six hundred and twenty five parts of an aqueous solution in which 5 parts of calcium acetate was dissolved were heated to 83° C. and stirred. The latex of the polymer (B-1) thus obtained was gradually dropped into this solution. Then, the resultant solution was heated to 91° C. and kept at this temperature for 5 minutes to coagulate the latex. The coagulated matter was separated and washed, and dried at 75° C. for 24 hours to obtain the polymer (B-1).

The rate of polymerization of the polymer (B-1) was 99%, (Mw) was 32,000, (Mn) was 9,000, and the amount of carboxyl group was 0.07 mmol/g.

The domain of the polymer (B-1) in the aromatic polycarbonate resin was not observed, and the polymer (B-1) was compatible with the aromatic polycarbonate resin.

Production Example 4

Production of the Polymer (B-2)

The same procedure as in Production Example 3 was carried out except that the monomer mixture was changed to the following composition to obtain the polymer (B-2).

Monomer Mixture:

| | |
|---|---|
| Phenyl methacrylate | 100.0 parts |
| 3-Mercaptopropionic acid | 3.0 part |
| t-Butyl hydroperoxide | 0.2 part |

The rate of polymerization of the polymer (B-2) was 99%, (Mw) was 14,000, (Mn) was 2,000, and the amount of carboxyl group was 0.2 mmol/g.

The domain of the polymer (B-2) in the aromatic polycarbonate resin was not observed, and the polymer (B-2) was compatible with the aromatic polycarbonate resin.

Production Example 5

Production of the Polymer (B-3)

The same procedure as in Production Example 3 was carried out except that the monomer mixture was changed to the following composition to obtain the polymer (B-3).

Monomer Mixture:

| | |
|---|---|
| Phenyl methacrylate | 75.0 parts |
| Methyl methacrylate | 25.0 parts |
| 3-Mercaptopropionic acid | 3.0 part |
| t-Butyl hydroperoxide | 0.2 part |

The rate of polymerization of the polymer (B-3) was 99%, (Mw) was 14,000, (Mn) was 2,000, and the amount of carboxyl group was 0.2 mmol/g.

The domain of the polymer (B-3) in the aromatic polycarbonate resin was not observed, and the polymer (B-3) was compatible with the aromatic polycarbonate resin.

Production Example 6

Production of the Polymer (B')

The same procedure as in Production Example 3 was carried out except that the monomer mixture was changed to the following composition to obtain the polymer (B').

Monomer Mixture:

| | |
|---|---|
| Phenyl methacrylate | 100.0 parts |
| n-Octyl mercaptane | 1.0 part |
| t-Butyl hydroperoxide | 0.2 part |

The rate of polymerization of the polymer (B') was 99%, (Mw) was 32,000, (Mn) was 9,000, and the amount of carboxyl group was 0.0 mmol/g.

The domain of the polymer (B') in the aromatic polycarbonate resin was not observed, and the polymer (B') was compatible with the aromatic polycarbonate resin.

Production Example 7

Production of the Polymer (C-1)

To a separable flask equipped with a thermometer, a nitrogen introducing pipe, a condenser, and a stirring device, the following emulsifier mixture was charged and stirred, and the flask was heated to the inside temperature of 60° C. under a nitrogen atmosphere.

Emulsifier Mixture:

| | |
|---|---|
| Phosphanol RS-610Na (an anion emulsifier, manufactured by Kao Corporation) | 1.0 part |
| Deionized water | 293 parts |

Then, the following reducing agent mixture was introduced into the separable flask.

Reducing Agent Mixture:

| | |
|---|---|
| Ferrous sulfate | 0.0001 part |
| Disodium ethylenediaminetetraacetate | 0.0003 part |
| Rongalit | 0.3 part |
| Deionized water | 5 parts |

The following monomer mixture was dropped into the separable flask over the period of 180 minutes, and then, the contents were stirred for 60 minutes and polymerization was finished to obtain a latex of the polymer (C-1).

Monomer Mixture:

| | |
|---|---|
| Styrene | 66.0 parts |
| α-Methyl styrene | 24.0 parts |
| Phenyl methacrylate | 10.0 parts |
| n-Octyl mercaptan | 0.5 part |
| t-Butyl hydroperoxide | 0.2 part |

Six hundred and twenty five parts of an aqueous solution in which 5 parts of calcium acetate was dissolved were heated to 83° C. and stirred. The latex of the polymer (C-1) thus obtained was gradually dropped into this solution. Then, the resultant solution was heated to 91° C. and kept at this temperature for 5 minutes to coagulate the latex. The coagulated matter was separated and washed, and dried at 75° C. for 24 hours to obtain the polymer (C-1).

The rate of polymerization of the polymer (C-1) was 95%, (Mw) was 52,000, and (Mn) was 23,000.

The (dv) of the polymer (C-1) in the aromatic polycarbonate resin was 0.4 µm, and the polymer (C-1) was incompatible with the aromatic polycarbonate resin.

Production Example 8

Production of the Polymer (C-2)

The same procedure as in Production Example 7 was carried out except that the monomer mixture was changed to the following composition to obtain the polymer (C-2).

Monomer Mixture:

| | |
|---|---|
| Styrene | 51.0 parts |
| α-Methyl styrene | 24.0 parts |
| Phenyl methacrylate | 25.0 parts |
| n-Octyl mercaptan | 1.0 part |
| t-Butyl hydroperoxide | 0.2 part |

The rate of polymerization of the polymer (C-2) was 95%, (Mw) was 25,000, and (Mn) was 13,000.

The (dv) of the polymer (C-2) in the aromatic polycarbonate resin was 0.4 µm, and the polymer (C-2) was incompatible with the aromatic polycarbonate resin.

Production Example 9

Production of the Polymer (C-3)

The same procedure as in Production Example 7 was carried out except that the monomer mixture was changed to the following composition to obtain the polymer (C-3).

Monomer Mixture:

| | |
|---|---|
| Styrene | 48.5 parts |
| α-Methyl styrene | 24.0 parts |
| Phenyl methacrylate | 27.5 parts |
| n-Octyl mercaptan | 0.55 part |
| t-Butyl hydroperoxide | 0.2 part |

The rate of polymerization of the polymer (C-3) was 95%, (Mw) was 45,000, and (Mn) was 21,000.

The (dv) of the polymer (C-3) in the aromatic polycarbonate resin was 0.4 μm, and the polymer (C-3) was incompatible with the aromatic polycarbonate resin.

Production Example 10

Production of the Polymer (C-4)

The same procedure as in Production Example 7 was carried out except that the monomer mixture was changed to the following composition to obtain the polymer (C-4).
Monomer Mixture:

| | |
|---|---|
| Styrene | 87.5 parts |
| Phenyl methacrylate | 12.5 parts |
| n-Octyl mercaptan | 0.5 part |
| t-Butyl hydroperoxide | 0.2 part |

The rate of polymerization of the polymer (C-4) was 95%, (Mw) was 49,000, and (Mn) was 22,000.

The (dv) of the polymer (C-4) in the aromatic polycarbonate resin was 0.4 μm, and the polymer (C-4) was incompatible with the aromatic polycarbonate resin.

Examples 1 to 7 and Comparative Examples 1 to 4

The fluidity-improving agents (1) to (11) were prepared by compounding the polymer (A), the polymer (B), and, if necessary, the polymer (C), with the ratios shown in Table 1.

TABLE 1

| | Example 1 | Example 2 | Example 3 | Example 4 | Example 5 | Example 6 |
|---|---|---|---|---|---|---|
| Fluidity improving agent | (1) | (2) | (3) | (4) | (5) | (6) |
| Constitution of fluidity improving agent Kind of polymer: amount [part] | A/B 50/50 | A/B 40/60 | A/B 60/40 | A/B/C 30/30/40 | A/B/C 30/30/40 | A/B/C 30/30/40 |
| Polymer (A) | A-1 | A-1 | A-1 | A-1 | A-1 | A-1 |
| Monomer (a1) Kind of monomer: amount [part] | St: 55 MSt: 24 | St: 55 MSt: 24 | St: 55 MSt: 24 | St: 55 MSt: 24 | St: 55 MSt: 24 | St: 55 MSt: 24 |
| Monomer (a2) Kind of monomer: amount [part] | PhMA: 20 | PhMA: 20 | PhMA: 20 | PhMA: 20 | PhMA: 20 | PhMA: 20 |
| Monomer (a3) Kind of monomer: amount [part] | GMA: 1 | GMA: 1 | GMA: 1 | GMA: 1 | GMA: 1 | GMA: 1 |
| Functional group (X) Kind of func. gr.: amount [mol/g] | Epoxy gr. 0.04 | Epoxy gr. 0.04 | Epoxy gr. 0.04 | Epoxy gr. 0.04 | Epoxy gr. 0.04 | Epoxy gr. 0.04 |
| Polymer (B) | B-1 | B-1 | B-1 | B-1 | B-1 | B-2 |
| Monomer (b1) Kind of monomer: amount [part] | PhMA: 100 | PhMA: 100 | PhMA: 100 | PhMA: 100 | PhMA: 100 | PhMA: 100 |
| Monomer (b2) Kind of monomer: amount [part] | — | — | — | — | — | — |
| Functional group (Y) Kind of func. gr.: amount [mol/g] | Carboxyl gr. 0.07 | Carboxyl gr. 0.07 | Carboxyl gr. 0.07 | Carboxyl gr. 0.07 | Carboxyl gr. 0.07 | Carboxyl gr. 0.2 |
| Polymer (C) | — | — | — | C-1 | C-2 | C-3 |
| Monomer (c1) Kind of monomer: amount [part] | — | — | — | St: 66 MSt: 24 | St: 51 MSt: 24 | St: 48.5 MSt: 24 |
| Monomer (c2) Kind of monomer: amount [part] | — | — | — | PhMA: 10 | PhMA: 25 | PhMA: 27.5 |

| | Example 7 | Comp. Ex. 1 | Comp. Ex. 2 | Comp. Ex. 3 | Comp. Ex. 4 |
|---|---|---|---|---|---|
| Fluidity improving agent | (7) | (8) | (9) | (10) | (11) |
| Constitution of fluidity improving agent Kind of polymer: amount [part] | A/B/C 30/30/40 | A 100 | C 100 | A'/B/C 30/30/40 | A/B'/C 30/30/40 |
| Polymer (A) | A-1 | A-1 | — | A' | A-1 |
| Monomer (a1) Kind of monomer: amount [part] | St: 55 MSt: 24 | St: 55 MSt: 24 | — | St: 50 MSt: 24 | St: 55 MSt: 24 |
| Monomer (a2) Kind of monomer: amount [part] | PhMA: 20 | PhMA: 20 | — | PhMA: 20 | PhMA: 20 |
| Monomer (a3) | GMA: 1 | GMA: 1 | — | GMA: 6 | GMA: 1 |

TABLE 1-continued

| Kind of monomer: amount [part] | | | | | |
|---|---|---|---|---|---|
| Functional group (X) | Epoxy gr. | Epoxy gr. | — | Epoxy gr. | Epoxy gr. |
| Kind of func. gr.: amount [mol/g] | 0.04 | 0.04 | | 0.35 | 0.04 |
| Polymer (B) | B-3 | — | — | B-1 | B' |
| Monomer (b1) Kind of monomer: amount [part] | PhMA: 75 | — | — | PhMA: 100 | PhMA: 100 |
| Monomer (b2) Kind of monomer: amount [part] | MMA: 25 | — | — | — | — |
| Functional group (Y) | Carboxyl gr. | — | — | Carboxyl gr. | — |
| Kind of func. gr.: amount [mol/g] | 0.2 | | | 0.07 | |
| Polymer (C) | C-3 | — | C-4 | C-1 | C-1 |
| Monomer (c1) Kind of monomer: amount [part] | St: 48.5 MSt: 24 | — | St: 87.5 | St: 66 MSt: 24 | St: 66 MSt: 24 |
| Monomer (c2) Kind of monomer: amount [part] | PhMA: 27.5 | — | PhMA: 12.5 | PhMA: 10 | PhMA: 10 |

Abbreviation: St; Styrene, MSt; α-methyl styrene, PhMA; Phenyl methacrylate, GMA; Glycidyl methacrylate, MMA; Methyl methacrylate, gr.; group, func. gr.; functional group

Example 8, Examples 10 to 15, and Comparative Examples 5 to 9

An aromatic polycarbonate resin (Panlite L-1225WS, manufactured by Teijin Chemicals Ltd.) and the fluidity-improving agents (1) to (11) were compounded in ratios shown in Table 2, supplied to a twin screw extruder (TEM-35, manufactured by Toshiba Machine Co., Ltd.), and melt kneaded at 280° C. to obtain aromatic polycarbonate resin compositions, respectively.

As a method for compounding each fluidity-improving agent with the aromatic polycarbonate resin, the aforementioned method (I) was used.

Example 9

The fluidity-improving agent (1) was supplied to a twin screw extruder (TEM-35, manufactured by Toshiba Machine Co., Ltd.) and melt kneaded at 200° C. to previously carry out the reaction between the polymer (A-1) and the polymer (B-1). It was confirmed that the reaction between the polymer (A-1) and the polymer (B-1) had been completed by measuring the amounts of the epoxy group and the carboxyl group.

When the polymer (A-1) and the polymer (B-1) were compounded, the amounts of the epoxy group and the carboxyl group in the fluidity-improving agent (1) were 0.02 mmol/g and 0.035 mmol/g, respectively. After the melt-kneading, these values became 0.00 mmol/g and 0.015 mmol/g, respectively, from which it was confirmed that the epoxy group and the carboxyl group in the fluidity-improving agent (1) had been quantitatively reacted.

After the reaction between the polymer (A-1) and the polymer (B-1) was previously carried out by means of the above operation, the resultant fluidity-improving agent (1) was compounded with the aromatic polycarbonate resin (Panlite L-1225WS, manufactured by Teijin Chemicals Ltd.) with the ratio shown in Table 2 and the resultant mixture was supplied to the twin screw extruder (TEM-35, manufactured by Toshiba Machine Co., Ltd.) and melt kneaded at 280° C. to obtain an aromatic polycarbonate resin composition.

As a method for compounding the fluidity-improving agent with the aromatic polycarbonate resin, the aforementioned method (II) was used.

The following evaluations were carried out using the aromatic polycarbonate resin compositions obtained in Examples 8 to 15 and Comparative Examples 5 to 9.

(Melt Fluidity)

Spiralflow length of each resin composition was evaluated using an injection molding machine (IS-100, manufactured by Toshiba Machine Co., Ltd.).

Injection molding was carried out under a condition of a molding temperature of 280° C., a mold temperature of 80° C., and an injection pressure of 98 MPa, and a shaped article had a thickness of 2 mm and a width of 15 mm. The evaluation results are shown in Table 2.

(Deterioration Attributed to Residence)

Deterioration of each resin composition attributed to residence was evaluated as follows.

The resin composition was held in a cylinder of the injection molding machine (IS-100, manufactured by Toshiba Machine Co., Ltd.) at 280° C. for 5 minutes, and then spiralflow length of the resin composition was measured. The evaluation condition of the spiralflow length was the same as that described in the section of melt fluidity.

The deterioration attributed to residence was evaluated based on the following standard. The evaluation results are shown in Table 2.

G: The spiralflow length changes less than 5% with respect to the value of melt fluidity.

NG: The spiralflow length changes not less than 5% with respect to the value of melt fluidity.

(Haze)

Transparency of each shaped article was evaluated by haze.

A resin composition was shaped by the injection molding machine (IS-100, manufactured by Toshiba Machine Co., Ltd.) to obtain a shaped article having a length of 150 mm, width of 100 mm, and a thickness of 3 mm. The shaped article was subjected to annealing treatment at 120° C. for 2 hours and then used for evaluation.

Haze of the resultant shaped article was measured at 23° C. according to ISO-14782. The evaluation results are shown in Table 2.

(Resistance to Exfoliation of Surface Layer)

A cut was made by a cutter on a trace of a sticking-out pin on each shaped article shaped under the same condition as that used in the evaluation of melt fluidity, and an exfoliation state of the surface layer was observed with a visual observation.

Resistance to exfoliation of the surface layer was evaluated based on the following standard. The evaluation results are shown in Table 2.
G: There is no exfoliation of the surface layer observed.
NG: There is exfoliation of the surface layer observed.
(Deflection Temperature Under Load)

Thermal resistance of each shaped article was evaluated by deflection temperature under load.

A resin composition was shaped using the injection molding machine (IS-100, manufactured by Toshiba Machine Co., Ltd.) to obtain a shaped article having a length of 80 mm, a width of 10 mm, and a thickness of 4 mm. The shaped article was subjected to annealing treatment at 120° C. for 2 hours and then used for evaluation.

Deflection temperature under load of the resultant shaped article was measured according to IS075-2. The load was set to 1.82 MPa. The evaluation results are shown in Table 2.
(DuPont Impact Test)

Impact resistance of each shaped article was evaluated by DuPont impact test.

A resin composition was shaped using the injection molding machine (IS-100, manufactured by Toshiba Machine Co., Ltd.) to obtain a shaped article having a length of 100 mm, a width of 50 mm, and a thickness of 2 mm.

DuPont impact test of the resultant shaped article was measured according to ASTM D2794. The evaluation results are shown in Table 2.
(Chemical Resistance Test)

Chemical resistance of each shaped article was evaluated by a cantilever test.

A resin composition was shaped using the injection molding machine (IS-100, manufactured by Toshiba Machine Co., Ltd.) to obtain a shaped article having a length of 150 mm, a width of 25 mm, and a thickness of 2 mm. The shaped article was subjected to annealing treatment at 120° C. and then used for evaluation. The test was carried out under the environment of 23° C. and 50% RH.

The cantilever test was carried out in accordance with the following procedure. The evaluation results are shown in Table 2.

1) A shaped article is supported at two points, namely, at an edge portion of the shaped article and at a position about 30 mm from the edge portion, namely a fulcrum. The shaped article is supported from an upper side at the edge portion and from a lower side at the fulcrum. In this case, each of the support at the edge portion and the support at the fulcrum is in contact with the shaped article in a line (not in a plane) orthogonal to a length direction of the shaped article to hold the shaped article horizontal.

2) A predetermined load is put on the other edge portion of the shaped article. A stress to be loaded on the shaped article is 20 MPa, and the weight is determined by the following calculation.

Stress (MPa)=$6 LW/bh^2$
L: Distance from the fulcrum to the load (m)
W: Load (N)
b: Width of the shaped article (m)
h: Thickness of the shaped article (m)

3) On an upper side of the fulcrum, namely, an opposite side of the fulcrum, a 10 mm square filter paper is placed and gasoline is absorbed in the filter paper in such a way that the gasoline does not flow out of the filter paper. The gasoline is regularly supplemented because the gasoline vaporizes.

4) The time, expressed in second, over the period of from when the gasoline is absorbed in the filter paper to when the shaped article is broken is measured with a stopwatch.

TABLE 2

|  | Ex. 8 | Ex. 9 | Ex. 10 | Ex. 11 | Ex. 12 | Ex. 13 | Ex. 14 | Ex. 15 |
|---|---|---|---|---|---|---|---|---|
| PC1 [part] | 90 | 90 | 90 | 90 | 90 | 90 | 87.5 | 87.5 |
| Fluidity improving agent Kind: Amount [part] | (1) 10 | (1) 10 | (2) 10 | (3) 10 | (4) 10 | (5) 10 | (6) 12.5 | (7) 12.5 |
| Compounding method of fluidity improving agent | (I) | (II) | (I) | (I) | (I) | (I) | (I) | (I) |
| Melt fluidity [mm] | 228 | 228 | 230 | 225 | 246 | 255 | 285 | 284 |
| Deterioration attributed to residence | G | G | G | G | G | G | G | G |
| Haze | 0.4 | 0.4 | 0.4 | 0.4 | 0.4 | 0.4 | 0.4 | 0.6 |
| Resistance to exfoliation of surface layer | G | G | G | G | G | G | G | G |
| Deflection temperature under load [° C.] | 134 | 134 | 134 | 134 | 134 | 134 | 134 | 134 |
| DuPont impact test [J] | 40 | 40 | 40 | 40 | 40 | 40 | 40 | 40 |
| Chemical resistance test [second] | 93 | 93 | 93 | 93 | 102 | 98 | 98 | 95 |

|  | Comp. Ex. 5 | Comp. Ex. 6 | Comp. Ex. 7 | Comp. Ex. 8 | Comp. Ex. 9 |
|---|---|---|---|---|---|
| PC1 [part] | 90 | 90 | 90 | 90 | 100 |
| Fluidity improving agent Kind: Amount [part] | (8) 10 | (9) 10 | (10) 10 | (11) 10 | — |
| Compounding method of fluidity improving agent | (I) | (I) | (I) | (I) | — |

TABLE 2-continued

| | | | | | |
|---|---|---|---|---|---|
| Melt fluidity [mm] | 273 | 350 | 218 | 234 | 158 |
| Deterioration attributed to residence | NG | G | NG | NG | G |
| Haze | 1.2 | 3.5 | 2.2 | 0.7 | 0.35 |
| Resistance to exfoliation of surface layer | G | NG | G | G | G |
| Deflection temperature under load [° C.] | 133 | 134 | 134 | 134 | 136 |
| DuPont impact test [J] | Not Mesureable | Not Mesureable | Not Mesureable | 1 | 42 |
| Chemical resistance test [second] | 86 | 600< | 100 | 87 | 100 |

Abbreviation: PC1; Aromatic polycarbonate resin (Panlite L-1225WS, manufactured by Teijin Chemicals Ltd.)

It is obvious from Table 2 that, as for the shaped articles of the aromatic polycarbonate resin compositions obtained in Examples 8 to 15, the fluidity-improving agents improved fluidity of the aromatic polycarbonate resins at the time of shaping without deteriorating the intrinsic characteristic properties of the aromatic polycarbonate resins, namely, transparency, resistance to exfoliation of surface layer, thermal resistance, impact resistance, and chemical resistance.

In Comparative Example 5 where the polymer (A-1) which was incompatible with the aromatic polycarbonate resin and had an epoxy group as the functional group (X) was singly used, transparency and impact resistance of the shaped article were deteriorated and deterioration of the resin composition attributed to residence was caused because an unreacted epoxy group still remained in the resin composition.

In Comparative Example 6 where the polymer (C-4) which was incompatible with the aromatic polycarbonate resin and did not have a functional group was singly used, transparency, resistance to exfoliation of surface layer, and impact resistance were lowered, though fluidity at the time of shaping and chemical resistance were improved.

In Comparative Example 7 where the fluidity-improving agent having an excess amount of epoxy group as the functional group (X) in the combination of the polymer (A) and the polymer (B) was used, transparency and impact resistance were lowered and deterioration of the resin composition attributed to residence was caused because an unreacted epoxy group still remained in the resin composition.

In Comparative Example 8 where the fluidity-improving agent in which the polymer (B) did not have the functional group (Y) in the combination of the polymer (A) and the polymer (B) was used, transparency and impact resistance were lowered and deterioration of the resin composition attributed to residence was caused because an unreacted epoxy group still remained in the resin composition.

In Comparative Example 9 where the fluidity-improving agent of the present invention was not compounded, fluidity was lower as compared with Examples 8 to 15.

Example 16 and Comparative Examples 10 and 11

An aromatic polycarbonate resin (Panlite L-1225WS or Panlite L-1225ZL-1, each manufactured by Teijin Chemicals Ltd.) and the fluidity-improving agent (5) were compounded in ratios shown in Table 3, supplied to a twin screw extruder (TEM-35, manufactured by Toshiba Machine Co., Ltd.), and melt-kneaded at 280° C. to obtain aromatic polycarbonate resin compositions, respectively.

As a method for compounding the fluidity-improving agent with the aromatic polycarbonate resin, the aforementioned method (I) was used.

Each resin composition was shaped using the injection molding machine (IS-100, manufactured by Toshiba Machine Co., Ltd.) to obtain a shaped article having a length of 100 mm, a width of 100 mm, and a thickness of 2 mm.

The following coating material composition was prepared and applied on each shaped article by spray-coating such that the thickness of a coating film after being cured became 8 μm.

Coating Material Composition:

| | |
|---|---|
| Dipentaerythritol pentacrylate | 40 parts |
| UA1 which is an urethane acrylate having a molecular weight of 2,500 obtained by a reaction among 2 moles of dicyclohexylmethane diisocyanate, 1 mole of nonabutylene glycol, and 2 moles of 2-hydroxyethyl acrylate | 24 parts |
| Tris(2-acryloyloxyethyl) isocyanurate | 23 parts |
| 2-(2-Hydroxy-5-t-butylphenyl)benzotriazole | 9 parts |
| Bis(1-octoxy-2,2,6,6-tetramethyl-4-piperidinyl) sebacate | 1 part |
| Benzophenone | 3 parts |
| Organic solvent components: | |
| Isobutanol | 140 parts |
| Normal butyl acetate | 50 parts |
| Butyl cellosolve | 20 parts |
| Cellosolve acetate | 10 parts |

Each shaped article was heated after the spray-coating to vaporize the organic solvent components in the coating material composition. Then, ultraviolet rays having wavelengths of 340 to 380 nm were irradiated on the shaped article with an integrated light quantity of 3,000 mJ/cm using a high pressure mercury lamp in air to form a cured coating film, namely, hard coat layer, on the surface of the shaped article.

The following evaluations were carried out on each shaped article on which the hard coat layer was formed and on each shaped article on which the hard coat layer was not formed.

(Instrumented Face Impact Test)

Instrumented face impact test of each shaped article was carried out under the following condition. The evaluation results are shown in Table 3.

Apparatus: High speed impact tester Hydroshot HTM-1 (manufactured by Shimadzu Corporation)

Punch center diameter: ½ inch

Punch receiver diameter: 3 inches

Punch movement speed: 1 m/second (Weather Resistance Test)

Weather resistance test was carried out according to ISO-4892 under the condition of black panel temperature of 63° C., humidity of 50%, and under intermittently sprayed water.

YI's of each shaped article before the test and after a lapse of 1,500 hours in the test were measured according to JIS-K7105. The evaluation results are shown in Table 3.

TABLE 3

|  |  | Example 16 | Comp. Ex. 10 | Comp. Ex. 11 |
|---|---|---|---|---|
| PC1 [part] |  | 90 | 100 | — |
| Low molecular weight PC [part] |  | — | — | 100 |
| Fluidity improving agent Kind: Amount [part] |  | (5) 10 | — | — |
| Compounding method of fluidity improving agent |  | (I) | — | — |
| Instrumented face impact test [kgf × mm] | Without hard coat layer | 3360 | 4030 | 3550 |
|  | With hard coat layer | 2750 | 1540 | 400 |
| Weather resistance test YI value (with hard coat layer) | Initial | 1.24 | 1.11 | 1.24 |
|  | After a lapse of 1,500 hours | 1.91 | 1.71 | 1.91 |

Abbreviation:
PC1; Aromatic polycarbonate resin (Panlite L-1225WS, manufactured by Teijin Chemicals Ltd.)
Low molecular weight PC; Aromatic polycarbonate resin (Panlite L-1225ZL-100, manufactured by Teijin Chemicals Ltd.)

It is obvious from Table 3 that the shaped article in Example 16, in which the fluidity-improving agent of the present invention is compounded, was excellent in face impact resistance and weather resistance as compared with the shaped articles in Comparative Examples 10 and 11.

Examples 17 and 18 and Comparative Examples 12 and 13

An aromatic polycarbonate resin (Panlite L-1225WS, manufactured by Teijin Chemicals Ltd.), the fluidity-improving agent (6), and a light diffusing agent were compounded in ratios shown in Table 4, supplied to a twin screw extruder (TEM-35, manufactured by Toshiba Machine Co., Ltd.), and melt kneaded at 280° C. to obtain aromatic polycarbonate resin compositions, respectively.

As a method for compounding the fluidity-improving agent with the aromatic polycarbonate resin, the aforementioned method (I) was used.

As the light diffusing agent, each of the following agents is used.

Acrylic light diffusing agent: Techpolymer MBX-5 (5 μm), manufactured by Sekisui plastics Co., Ltd.

Silicone type light diffusing agent: Tospearl 120 (2 μm), manufactured by Momentive Performance Materials Japan LLC, former GE Toshiba Silicones Co., Ltd.

The following evaluations were carried out using the aromatic polycarbonate resin compositions thus obtained.
(Melt Fluidity)

Melt fluidity of each aromatic polycarbonate resin composition was evaluated in accordance with the aforementioned method. The evaluation results are shown in Table 4.
(Light Diffusivity)

Light diffusivity of each shaped article was evaluated as follows.

Each resin composition was shaped using an injection molding machine (IS-100, manufactured by Toshiba Machine Co., Ltd.) to obtain a shaped article (light diffusing plate) having a length of 100 mm, a width of 100 mm, and a thickness of 2 mm.

Light diffusivity of the light diffusing plate was measured according to DIN 5036, using a goniometer (GP-200, manufactured by Murakami Color Research Laboratory). The evaluation results are shown in Table 4.
(DuPont Impact Test)

Impact resistance of each shaped article was evaluated with DuPont impact test.

Each resin composition was shaped using an injection molding machine (IS-100, manufactured by Toshiba Machine Co., Ltd.) to obtain a shaped article (light diffusing plate) having a length of 100 mm, a width of 50 mm, and a thickness of 2 mm.

DuPont impact test of the light diffusing plate was measured according to ASTM D2794. The evaluation results are shown in Table 4.

TABLE 4

|  | Example 17 | Example 18 | Comp. Ex. 12 | Comp. Ex. 13 |
|---|---|---|---|---|
| PC1 [part] | 87.4 | 87.4 | 99.9 | 99.9 |
| Fluidity improving agent Kind: Amount [part] | (6) 12.5 | (6) 12.5 | — | — |
| Light diffusing agent A | 0.1 | — | 0.1 | — |
| Light diffusing agent S | — | 0.1 | — | 0.1 |
| Compounding method of fluidity improving agent | (I) | (I) | — | — |
| Melt fluidity [mm] | 260 | 263 | 154 | 157 |
| Light diffusivity | 47.8 | 103.1 | 47.1 | 103.1 |
| DuPont impact test [J] | 47 | 45 | 47 | 45 |

Abbreviation:
PC1; Aromatic polycarbonate resin (Panlite L-1225WS, manufactured by Teijin Chemicals Ltd.)
Light diffusing agent A; Acrylic light diffusing agent (Techpolymer MBX-5 (5 μm), manufactured by Sekisui Plastics Co., Ltd.)
Light diffusing agent S; Silicone type light diffusing agent (Tospearl 120 (2 μm), manufactured by Momentive Performance Materials Japan LLC, former GE Toshiba Silicones Co., Ltd.)

It is obvious from Table 4 that fluidity at the time of shaping was improved in the aromatic polycarbonate resin composition in Example 17 or 18, in which the fluidity-improving agent of the present invention was compounded, as compared with that in the aromatic polycarbonate resin composition in Comparative Example 12 or 13, in which the fluidity-improving agent of the present invention was not compounded.

As for the light diffusing plate in Example 17 or 18, in which the fluidity-improving agent of the present invention was compounded, it was confirmed that light diffusivity and impact resistance were not deteriorated as compared with those of light diffusing plate in Comparative Example 12 or 13, in which the fluidity-improving agent of the present invention was not compounded.

Example 19 and Comparative Example 14

An aromatic polycarbonate resin (Panlite AD-5503, manufactured by Teijin Chemicals Ltd.) and the fluidity-improving agent (5) were compounded in ratios shown in Table 5, supplied to a twin screw extruder (TEM-35, manufactured by Toshiba Machine Co., Ltd.), and melt kneaded at 280° C. to obtain aromatic polycarbonate resin compositions, respectively.

As a method for compounding the fluidity-improving agent with the aromatic polycarbonate resin, the aforementioned method (I) was used.

The following evaluations were carried out using the aromatic polycarbonate resin compositions thus obtained.

(Melt Fluidity)

Melt fluidity of each aromatic polycarbonate resin composition was evaluated in accordance with the aforementioned method. The evaluation results are shown in Table 5.

(Transfer Properties)

Transfer properties in the case of shaping each optical disk were evaluated as follows.

An optical disk substrate was shaped under the condition of a predetermined cylinder temperature of 320° C., a mold temperature of 110° C., a clamping force of 15 ton, and a cooling time of 15 seconds, using an injection molding machine (M35B-D-DM, manufactured by Meiki Co., Ltd.), a mold having a cavity thickness of 1.2 mm and a diameter of 120 mm, and a stamper having a capacity of 22.5 GB and grooves with a groove depth of 43 nm and a groove pitch of 0.6 μm.

A depth of the groove of the optical disk substrate thus obtained at a radius of 25 mm was measured with an atomic force microscope (SPI3700, manufactured by Seiko Instruments Inc.).

Transfer properties of each optical disk substrate were evaluated based on the following standard. The evaluation results are shown in Table 5.

NG: The depth of the groove is smaller than that in the case of an aromatic polycarbonate resin alone S: The depth of the groove is the same as that in the case of an aromatic polycarbonate resin alone G: The depth of the groove is larger than that in the case of an aromatic polycarbonate resin alone (Water Absorption Coefficient)

Each resin composition was shaped using the injection molding machine (IS-100, manufactured by Toshiba Machine Co., Ltd.) to obtain a shaped article having a length of 100 mm, a width of 50 mm, and a thickness of 3 mm.

Water absorption coefficient of the shaped article was measured in accordance with the following procedure. The evaluation results are shown in Table 5.

1) The shaped article is kept over night under the environment of a temperature of 23° C. and a humidity of 50% and the mass of the shaped article is measured. (A)

2) The shaped article is soaked in pure water and taken out after a lapse of 24 hours, and adhering water is wiped off to measure the mass of the resultant shaped article. (B)

3) Water absorption coefficient of the shaped article is calculated by the following equation.

$$(B-A)/A \times 100 [\%]$$

TABLE 5

|  | Example 19 | Comp. Ex. 14 |
|---|---|---|
| PC2 [part] | 90 | 100 |
| Fluidity improving agent | (5) | — |
| Kind: Amount [part] | 10 | |
| Compounding method of fluidity improving agent | (I) | — |
| Melt fluidity [mm] | 427 | 349 |
| Transfer properties | G | — |
| Water absorption coefficient | 0.2% | 0.2% |
| Warp | Non | Non |

Abbreviation:
PC2; Aromatic polycarbonate resin (Panlite AD-5503, manufactured by Teijin Chemicals Ltd.)

(Warp)

Each resin composition was shaped using the injection molding machine (IS-100, manufactured by Toshiba Machine Co., Ltd.) to obtain a shaped article having a length of 100 mm, a width of 50 mm, and a thickness of 2 mm.

The shaped article thus obtained was kept in sequence in the following environments (a), (b), and (c).

(a) Keeping it under the environment of a temperature of 23° C. and a humidity of 50% for 24 hours (b) Keeping it in a temperature controlled bath at a temperature of 30° C. and a humidity of 90% for 24 hours (c) Keeping it under the environment of a temperature of 23° C. and a humidity of 50% for 72 hours Warp of each shaped article under each of the aforementioned environments was evaluated.

The measurement of warp was carried out such that the shaped article was placed on a horizontal plate and the distances from the plate to the rear surface of the shaped article were measured along the longitudinal direction in the center of the shaped article using a noncontact three-dimensional measuring apparatus (NH-3MA, manufactured by Mitakakohki Co., Ltd.). The measurement results are shown in FIG. 1.

In FIG. 1, the horizontal axis represents a position (x) in the shaped article along the longitudinal direction and the vertical axis represents a distance (y) from the horizontal plate to the rear surface of the shaped article.

The positions where (x) are 0 to 10 mm and 90 to 100 mm are peripheral parts of the shaped article, so that (y) are large owing to fin caused by injection molding. Consequently, a value of (y) at a position where (x) is 20 mm was evaluated.

The values of (y) at a position where (x) is 20 mm were fluctuating from about 8 to 12 μm in the case of the shaped article of Example 19 and from about 9 to 11 μm in the case of the shaped article of Comparative Example 14. These fluctuations were within measurement error.

(Birefringence)

Each resin composition was shaped using the injection molding machine (IS-100, manufactured by Toshiba Machine Co., Ltd.) to obtain a shaped article having a length of 150 mm, a width of 150 mm, and a thickness of 2 mm.

Phase difference near the center portion of each shaped article was measured by transmission method using a fast spectroscopic ellipsometer (M-2000, manufactured by J. A. Woollam Co., Inc.).

The smaller phase difference means the lower birefringence of the shaped article. The measurement results are shown in FIG. 2.

Figure 2:
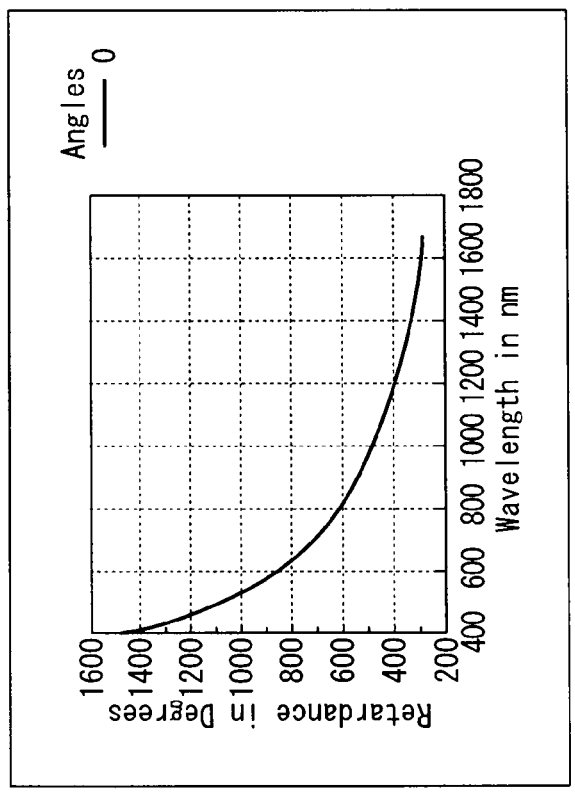
FIG. 2: A diagram illustrating the results of measurement of phase difference (Example 19 and Comparative Example 14).
Figure 2:
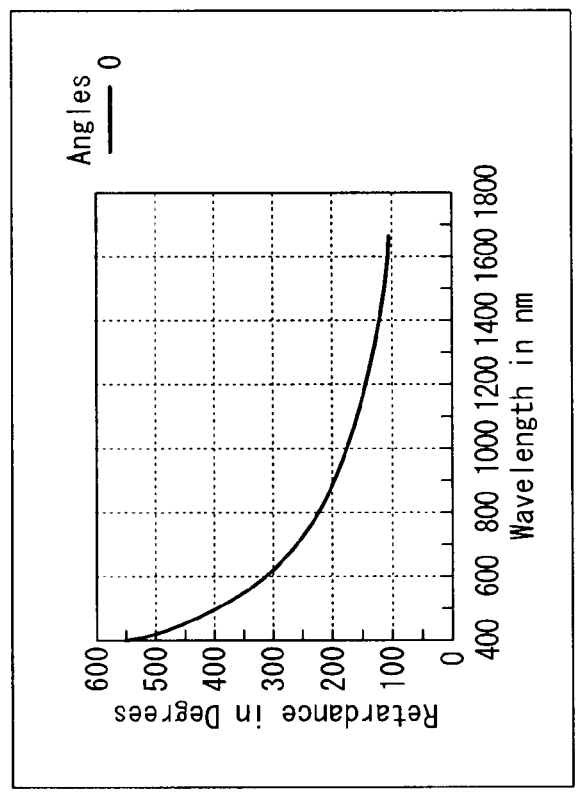

It is obvious from Table 5, FIG. 1, and FIG. 2 that fluidity at the time of shaping was improved in the aromatic polycarbonate resin composition in Example 19, in which the fluidity-improving agent of the present invention was compounded, as compared with that in the aromatic polycarbonate resin composition in Comparative Example 14, in which the fluidity-improving agent of the present invention was not compounded.

As for the shaped article in Example 19, in which the fluidity-improving agent of the present invention was compounded, transfer properties and birefringence were improved as compared with those of the shaped article in Comparative Example 14, in which the fluidity-improving agent of the present invention was not compounded. In addition, it was confirmed that water absorption coefficient and warp were not deteriorated.

Examples 20 and 21 and Comparative Example 15

An aromatic polycarbonate resin (Tarflon FN-1500, manufactured by Idemitsu Kosan Co., Ltd.) and the fluidity-improving agent (6) were compounded in ratios shown in Table 6, supplied to a twin screw extruder (TEM-35, manufactured by Toshiba Machine Co., Ltd.), and melt kneaded at 280° C. to obtain aromatic polycarbonate resin compositions, respectively.

As a method for compounding the fluidity-improving agent with the aromatic polycarbonate resin, the aforementioned method (I) was used.

The following evaluations were carried out using the aromatic polycarbonate resin compositions thus obtained.

(Melt Fluidity)

Melt fluidity of each aromatic polycarbonate resin composition was evaluated in accordance with the aforementioned method. The evaluation results are shown in Table 6.

(Transfer Properties)

Transfer properties in the case of shaping each shaped article were evaluated as follows.

A shaped article, namely, a light guide plate, was obtained by carrying out shaping under the condition of a predetermined cylinder temperature, a mold temperature of 100° C., an injection pressure of 270 MPa, an injection speed of 280 to 300 m/second, an injection time of 10 seconds, and a cooling time of 20 seconds, using an injection molding machine (J35AD, manufactured by Japan Steel Works, Ltd.) and a mold having a length of 52 mm, a width of 38 mm, and a thickness of 0.4 mm and having on one side repeatedly carved grooves with an isosceles triangle shape of a height of 11 μm and a base of 50 μm.

By visual observation of the shaped article, the lowest limit of the predetermined cylinder temperature of the injection molding machine at which a pattern of the mold is excellently transferred to the shaped article was determined. The evaluation results are shown in Table 6.

(Measurement of Brightness)

1) Production of a Backlight Unit

The light guide plate obtained in the evaluation of transfer properties was placed with the side on which the grooves were formed being faced downward, a reflection plate, which is a silver reflection sheet having a thickness of 75 μm, manufactured by Reiko Co., Ltd., was placed beneath the light guide plate, and a prism sheet (DIAART MD68YS, manufactured by Mitsubishi Rayon Co., Ltd.) was placed upon the light guide plate.

A LED light source, electric current being 20 mA, was arranged to be faced to the short side of the light guide plate and the LED light source was turned on.

2) Measurement of Brightness

Brightness of the center portion of the light guide plate was measured, setting a brightness meter (BM-7, manufactured by Topcon Technohouse Corporation) 500 mm apart from the light guide plate. The evaluation results are shown in Table 6.

(Measurement of Brightness Distribution)

Brightness distribution of the center portion of the light guide plate was measured, setting a viewing angle measuring device (EZCONTRAST 160R, manufactured by ELDIM) 1 mm apart from the light guide plate.

Measuring range of brightness distribution was determined to be an orthogonal direction and a horizontal direction with respect to the direction to which the light from the LED light source advanced.

The maximum brightness and the full width at half maximum were calculated. The evaluation results are shown in Table 6.

TABLE 6

|  |  | Example 20 | Example 21 | Comp. Ex. 15 |
|---|---|---|---|---|
| PC3 [part] |  | 87.5 | 82.5 | 100 |
| Fluidity improving agent |  | (6) | (6) | — |
| Kind: Amount [part] |  | 12.5 | 17.5 |  |
| Compounding method of fluidity improving agent |  | (I) | (I) | — |
| Melt fluidity [mm] |  | 418 | 508 | 326 |
| Transfer properties [° C.] |  | 300 | 280 | 330 |
| Brightness [cd/m$^2$] |  | 5391 | 5673 | 5572 |
| Brightness distribution Horizontal direction | Maximum brightness [cd/m$^2$] | 4701 | 4913 | 4749 |
|  | Half-width [°] | 23.4 | 24.0 | 23.5 |
| Brightness distribution Orthogonal direction | Maximum brightness [cd/m$^2$] | 4689 | 4878 | 4738 |
|  | Half-width [°] | 55.0 | 52.7 | 51.8 |

Abbreviation:
PC3; Aromatic polycarbonate resin (Tarflon FN-1500, manufactured by Idemitsu Kosan Co., Ltd.)

It is obvious from Table 6 that fluidity at the time of shaping was improved in the aromatic polycarbonate resin composition in Example 20 or 21, in which the fluidity-improving agent of the present invention was compounded, as compared with that in the aromatic polycarbonate resin composition in Comparative Example 15, in which the fluidity-improving agent of the present invention was not compounded.

As for the shaped article in Example 20 or 21, in which the fluidity-improving agent of the present invention was compounded, transfer properties were improved as compared with those of the shaped article in Comparative Example 15, in which the fluidity-improving agent of the present invention was not compounded. In addition, it was confirmed that brightness and brightness distribution were not deteriorated.

INDUSTRIAL APPLICABILITY

According to the fluidity-improving agent of the present invention, it can improve fluidity of an aromatic polycarbonate resin at the time of shaping without deteriorating the intrinsic characteristic properties of the aromatic polycarbonate resin, namely, transparency, resistance to exfoliation of surface layer, thermal resistance, impact resistance, and chemical resistance. Consequently, the aromatic polycarbonate resin composition of the present invention can realize shaping of a large sized thin-walled shaped article having a complicated shape and can be suitably applied for variety of uses such as hard coated articles, glazing materials, light diffusing plates, optical disk substrates, light guide plates, medical materials, and sundries.

The invention claimed is:
1. A fluidity-improving agent, comprising:
0.5 to 99.5 parts by mass of a polymer (A) which is obtained by polymerizing a monomer mixture (a) comprising 0.5 to 99% by mass of (a1) an aromatic vinyl monomer, 0.5 to 99% by mass of (a2) a phenyl(meth)acrylate or a phenyl(meth)acrylate comprising a substituent in a phenyl group, and 0.5 to 5% by mass of (a3) a vinyl monomer comprising at least one functional group (X) selected from the group consisting of an epoxy group, a carboxyl group, a hydroxyl group and an amino group; and
0.5 to 99.5 parts by mass of a polymer (B) which is obtained by polymerizing a monomer mixture (b) comprising (b1) a phenyl(meth)acrylate or a phenyl(meth)acrylate comprising a substituent in a phenyl group with a compound comprising a functional group (Y) capable of reacting with the functional group (X), with the proviso that a total of the polymer (A) and the polymer (B) is 100 parts by mass.

2. A fluidity-improving agent, comprising:
10 to 45 parts by mass of a polymer (A) which is obtained by polymerizing a monomer mixture (a) comprising 0.5 to 99% by mass of (a1) an aromatic vinyl monomer, 0.5 to 99% by mass of (a2) a phenyl(meth)acrylate or a phenyl (meth)acrylate comprising a substituent in a phenyl group, and 0.5 to 5% by mass of (a3) a vinyl monomer comprising at least one functional group (X) selected from the group consisting of an epoxy group, a carboxyl group, a hydroxyl group and an amino group;
10 to 45 parts by mass of a polymer (B) which is obtained by polymerizing a monomer mixture (b) comprising (b1) a phenyl(meth)acrylate or a phenyl (meth)acrylate comprising a substituent in a phenyl group with a compound comprising a functional group (Y) capable of reacting with the functional group (X); and
10 to 80 parts by mass of a polymer (C) which is obtained by polymerizing a monomer mixture (c) comprising 0.5 to 99.5% by mass of (c1) an aromatic vinyl monomer and 0.5 to 99.5% by mass of (c2) a phenyl(meth)acrylate or a phenyl(meth)acrylate comprising a substituent in a phenyl group, with the proviso that a total of the polymers (A) to (C) is 100 parts by mass.

3. The agent of claim 1 or 2, wherein the fluidity-improving agent is obtained by reacting the functional group (X) possessed by the polymer (A) with the functional group (Y) possessed by the polymer (B).

4. A fluidity-improving agent comprising:
0.5 to 99.5 parts by mass of a polymer (A) which is obtained by polymerizing a monomer mixture (a) comprising 0.5 to 99% by mass of (a1) an aromatic vinyl monomer, 0.5 to 99% by mass of (a2) a phenyl(meth)acrylate or a phenyl(meth)acrylate comprising a substituent in a phenyl group, and 0.5 to 5% by mass of (a3) a vinyl monomer comprising at least one functional group (X); and
0.5 to 99.5 parts by mass of a polymer (B) which is obtained by polymerizing a monomer mixture (b) comprising (b1) a phenyl(meth)acrylate or a phenyl(meth) acrylate comprising a substituent in a phenyl group with a compound comprising a functional group (Y) capable of reacting with the functional group (X), with the proviso that a total of the polymer (A) and the polymer (B) is 100 parts by mass, and wherein the functional group (X) is an epoxy group and the functional group (Y) is a carboxyl group.

5. An aromatic polycarbonate resin composition, comprising 70 to 99.9% by mass of an aromatic polycarbonate resin and 0.1 to 30% by mass of the agent of claim 1.

6. An aromatic polycarbonate resin composition, comprising 69.9 to 99.8% by mass of an aromatic polycarbonate resin, 0.1 to 30% by mass of the agent of claim 1, and 0.1 to 30% by mass of a light diffusing agent.

7. A shaped article obtained by shaping the aromatic polycarbonate resin composition of claim 5 or 6.

8. The article of claim 7, further comprising a hard coat layer on a surface of the shaped article.

9. A method of producing a glazing material, the method comprising:
shaping the composition of claim 5, to obtain a glazing material.

10. A light diffusing plate obtained by shaping the aromatic polycarbonate resin composition of claim 6.

11. An optical disk substrate obtained by shaping the aromatic polycarbonate resin composition of claim 5.

12. A light guide plate obtained by shaping the aromatic polycarbonate resin composition of claim 5.

13. The method of claim 9, further comprising:
coating the glazing material with a hard coat layer.

14. A glazing material, comprising the shaped article of claim 7.

15. A glazing material, comprising the hard coated article of claim 8.

\* \* \* \* \*